United States Patent [19]

Haas, Sr. et al.

[11] 4,438,685
[45] Mar. 27, 1984

[54] WAFER BAKING OVEN

[76] Inventors: Franz Haas, Sr., Gerstlgasse 25, A-1210 Wien; Franz Haas, Jr., Kreuzgasse, A-2100 Leobendorf; Johann Haas, Seitweg 4, A-3400 Klosterneuburg, all of Austria

[21] Appl. No.: 376,954

[22] Filed: May 11, 1982

[30] Foreign Application Priority Data

May 11, 1981 [AT] Austria ............................... 2093/81

[51] Int. Cl.³ .............................................. A47J 37/00
[52] U.S. Cl. ...................................... 99/342; 99/373; 134/56 R; 198/340; 432/32; 432/75
[58] Field of Search ............. 99/423, 373, 341, 443 C, 99/342, 343, 374, 427; 134/56; 432/32, 75; 198/340

[56] References Cited

U.S. PATENT DOCUMENTS

| | | | |
|---|---|---|---|
| 881,824 | 3/1908 | Peters | 99/373 |
| 967,147 | 8/1910 | Trewick | 99/373 |
| 990,577 | 4/1911 | Mayle | 99/373 |
| 1,936,649 | 11/1933 | Tatosian | 99/373 |
| 2,624,297 | 1/1953 | Nuttall | 99/373 |

*Primary Examiner*—Billy J. Wilhite
*Attorney, Agent, or Firm*—Schwartz, Jeffery, Schwaab, Mack, Blumenthal & Koch

[57] ABSTRACT

A wafer baking oven for making baked wafers from batter includes an elongated baking chamber with heating elements therein. A thermally insulated enclosure surrounds at least part of the baking chamber. The oven includes a front port adjoining the baking chamber. There are a plurality of baking tongs in the baking chamber, which baking tongs move through the baking chamber and into and out of the front port in a running direction. The baking prongs are openable when in the front port for the removal of baked wafers from the tongs and for charging the baking tongs with batter. The baking tongs are then closed and are moved through the baking chamber in the closed state. The front port includes a charging station for charging the baking tongs with batter and a discharge station for discharging baked wafers along a path. The insulated enclosure includes a pair of lateral walls defining the lateral sides of the baking chamber, a sealing wall defining the top side of the baking chamber and a rear wall defining the rear side of the baking chamber. The baking chamber has a baking chamber exhaust for exhausting gases from the baking chamber. The insulated enclosure substantially completely encloses at least the baking chamber on its two lateral sides, on its ceiling walls, and at its rear wall, with the exception of the baking chamber exhaust. The baking chamber is also substantially completely enclosed at its bottom side.

152 Claims, 68 Drawing Figures

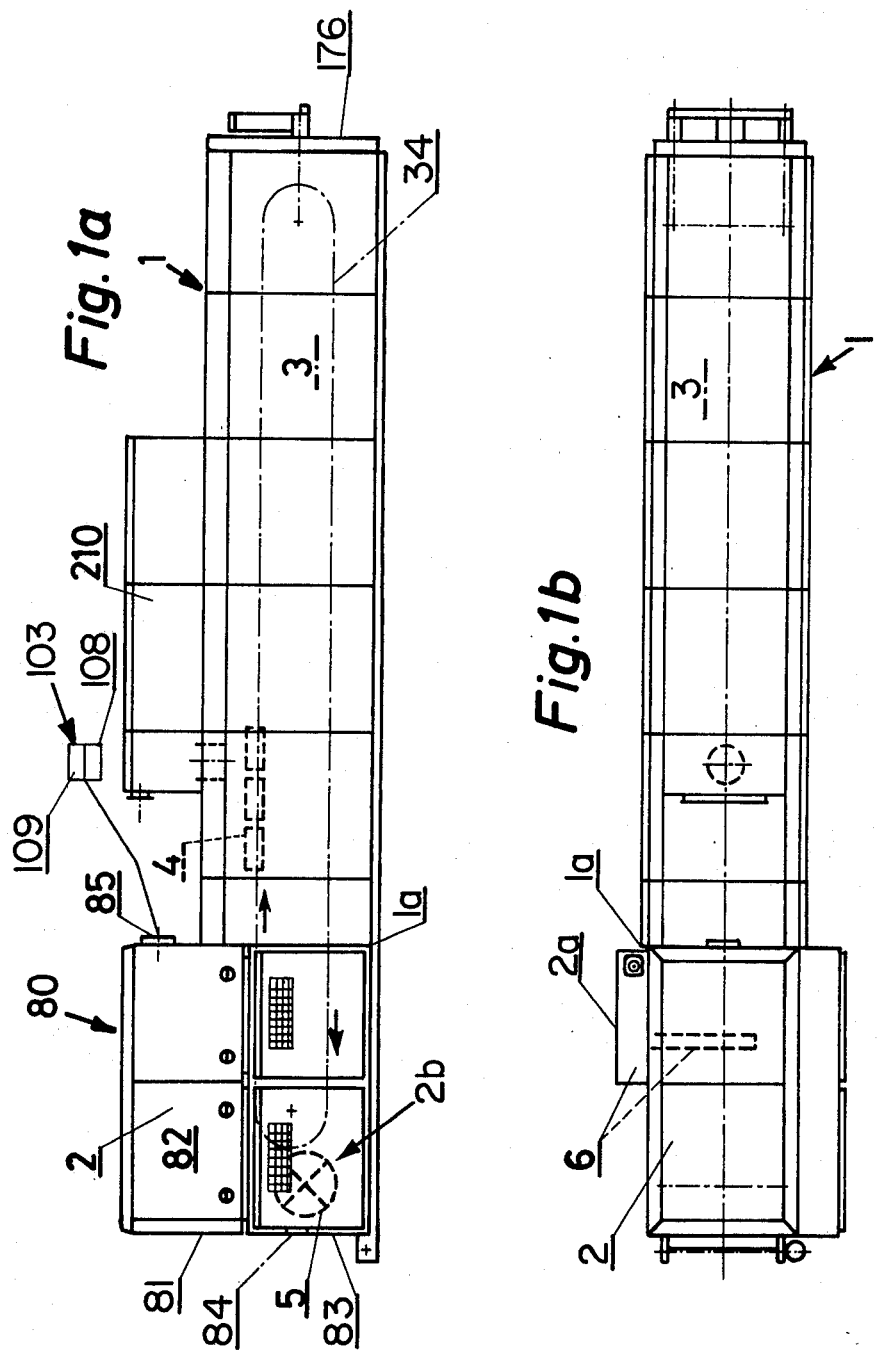

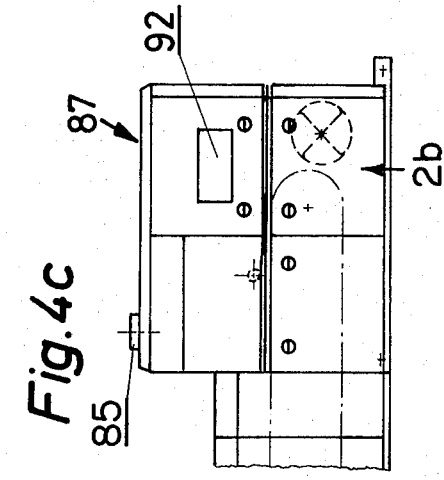
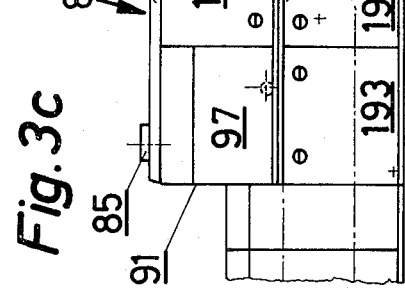
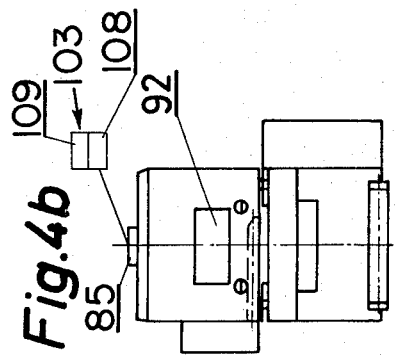
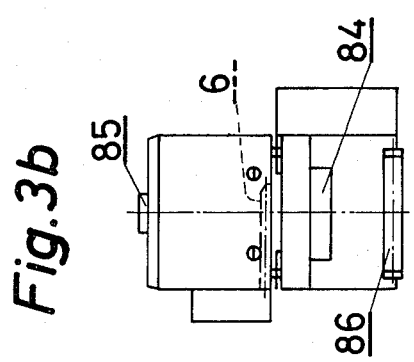
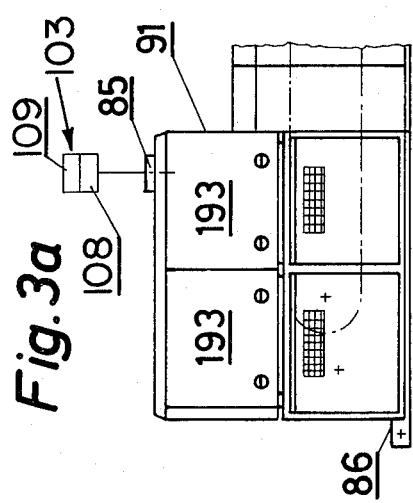
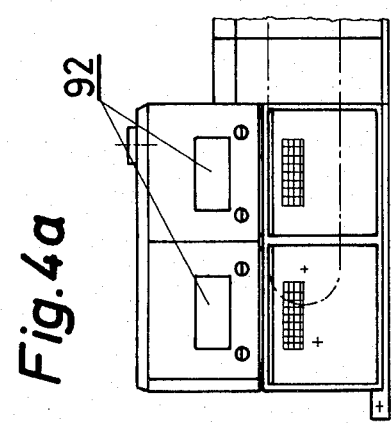

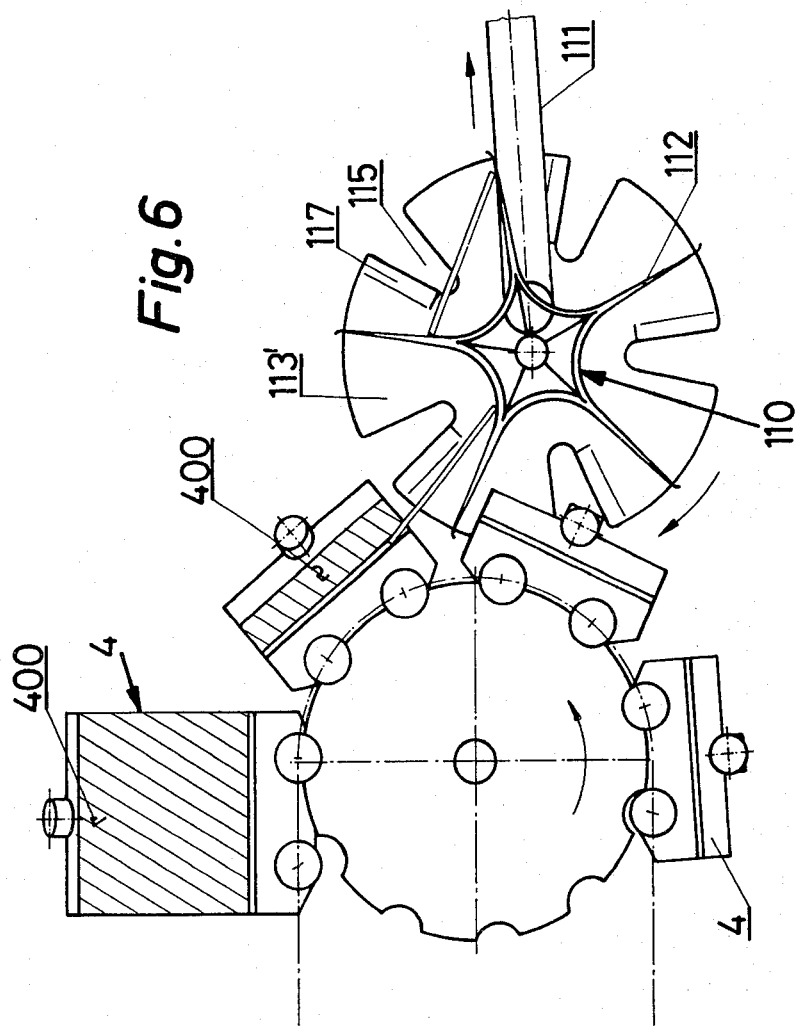

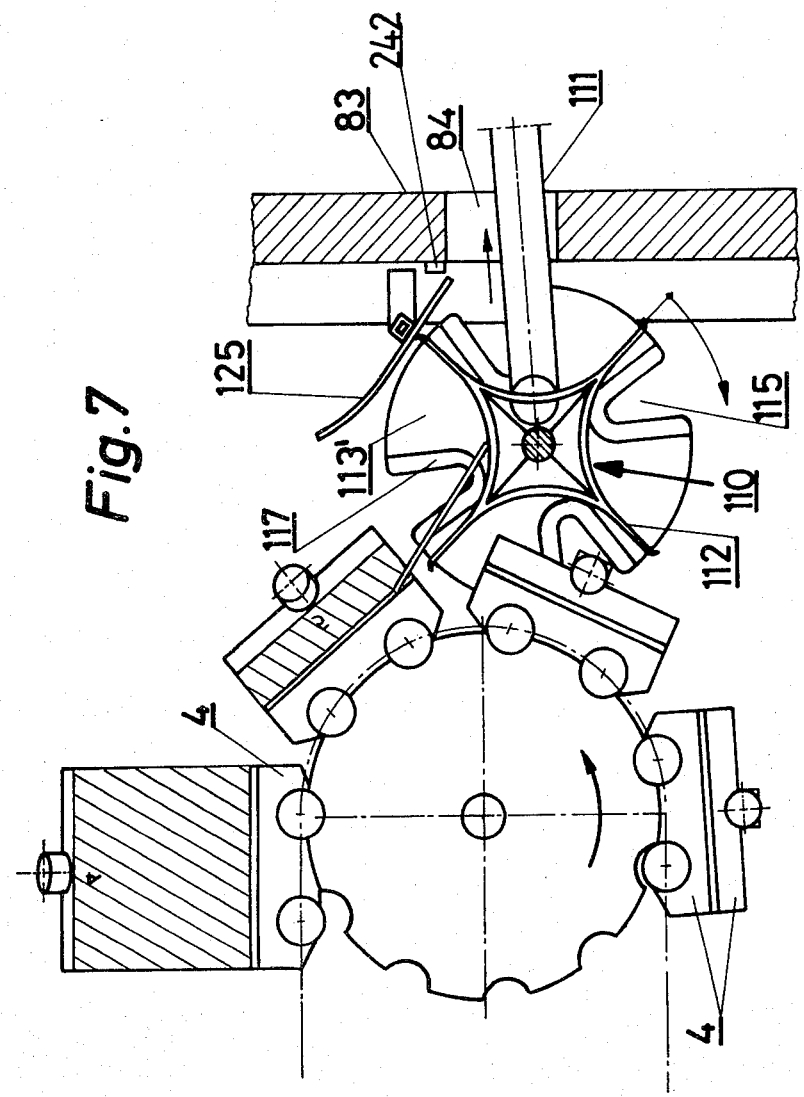

AA

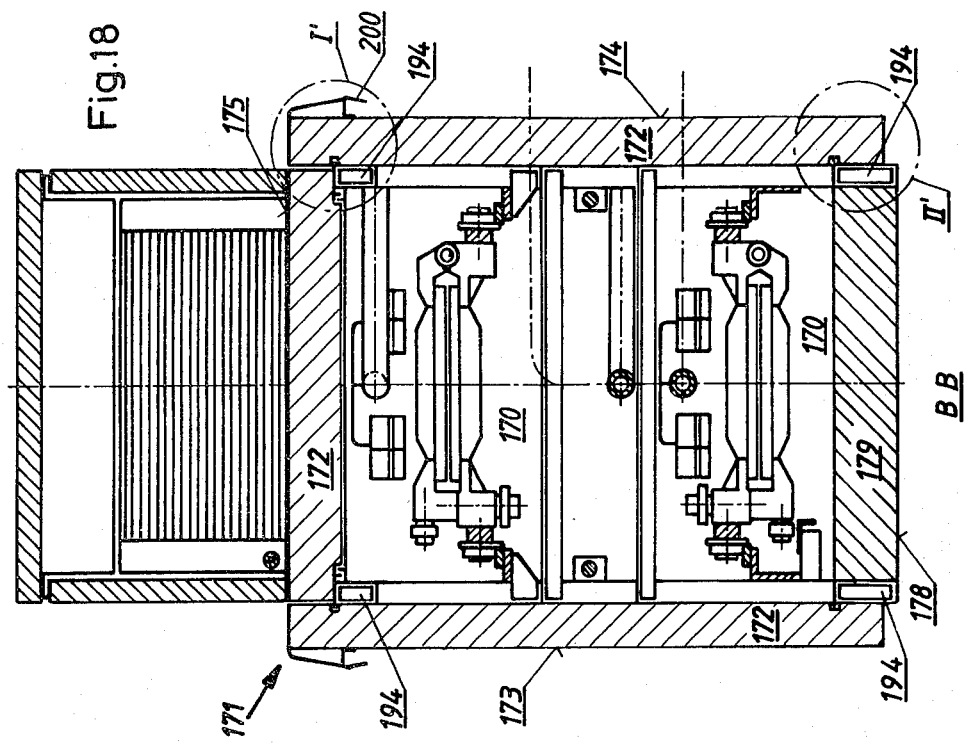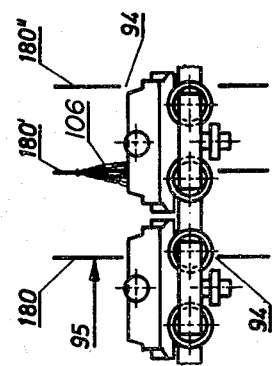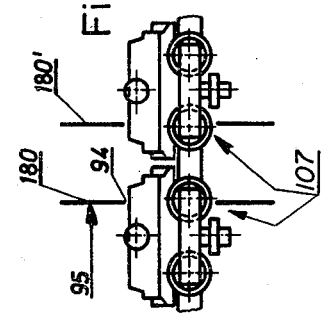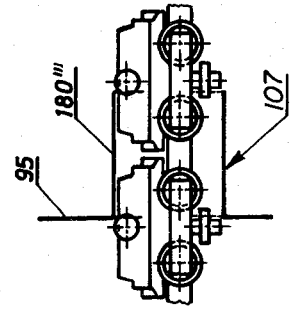

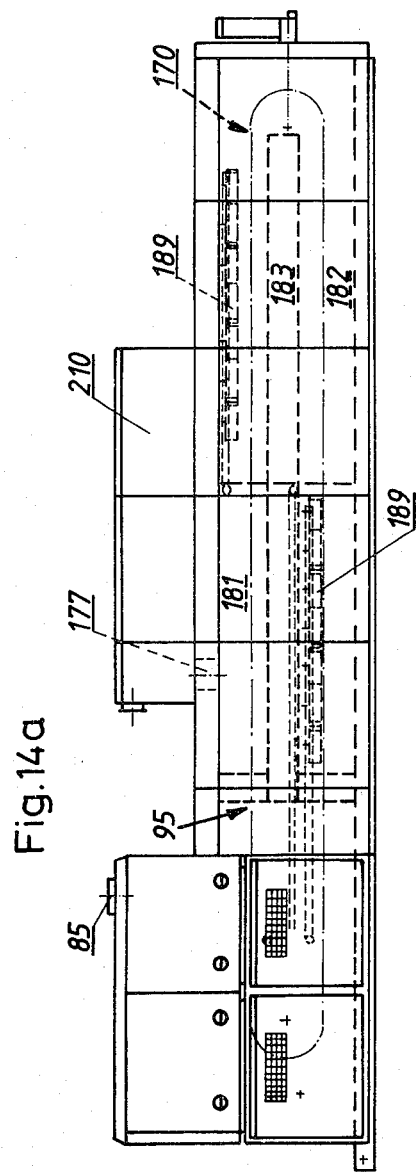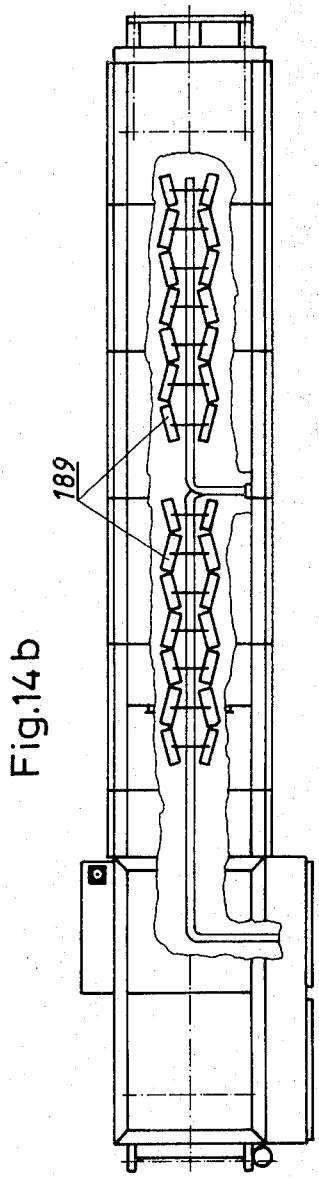
Fig.14a
Fig.14b

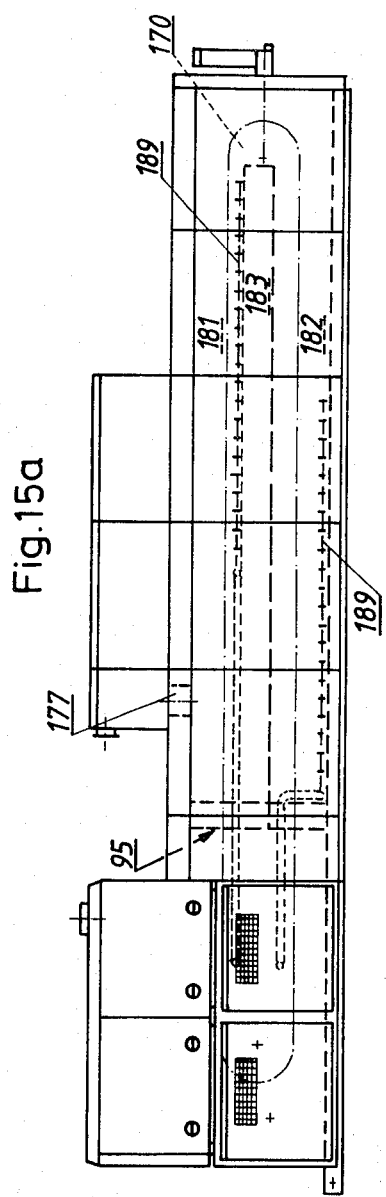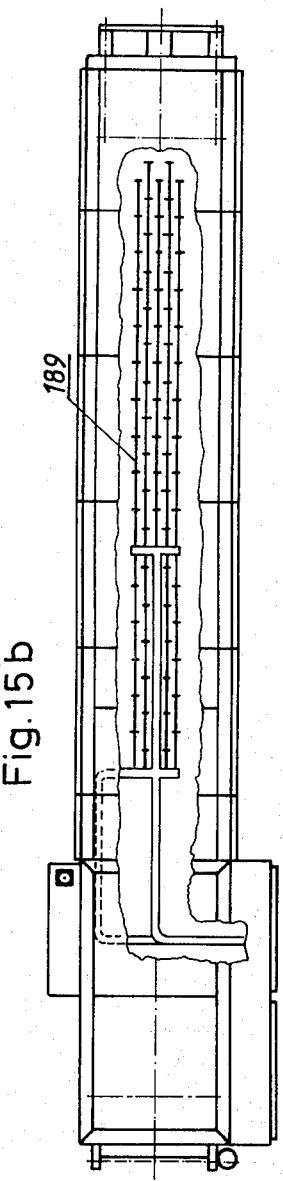

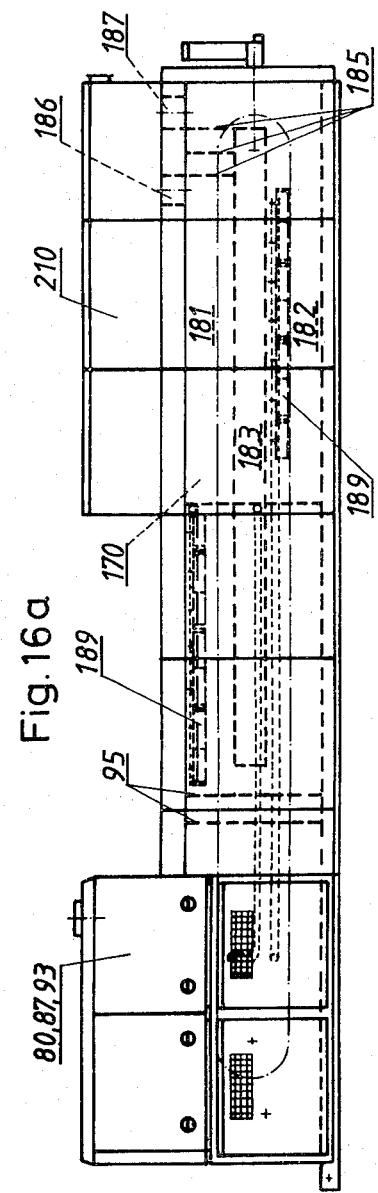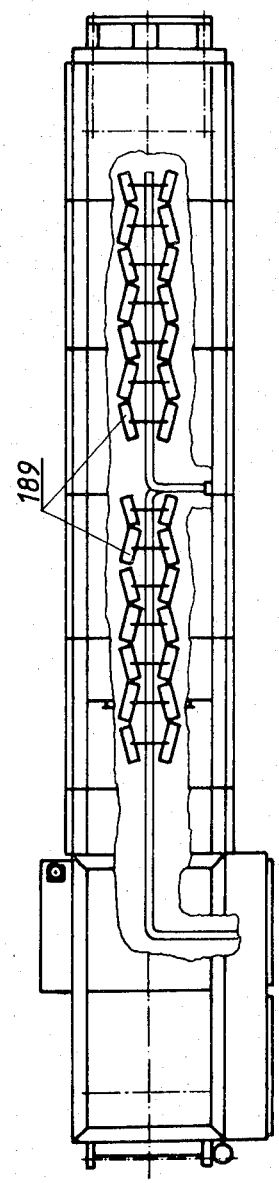

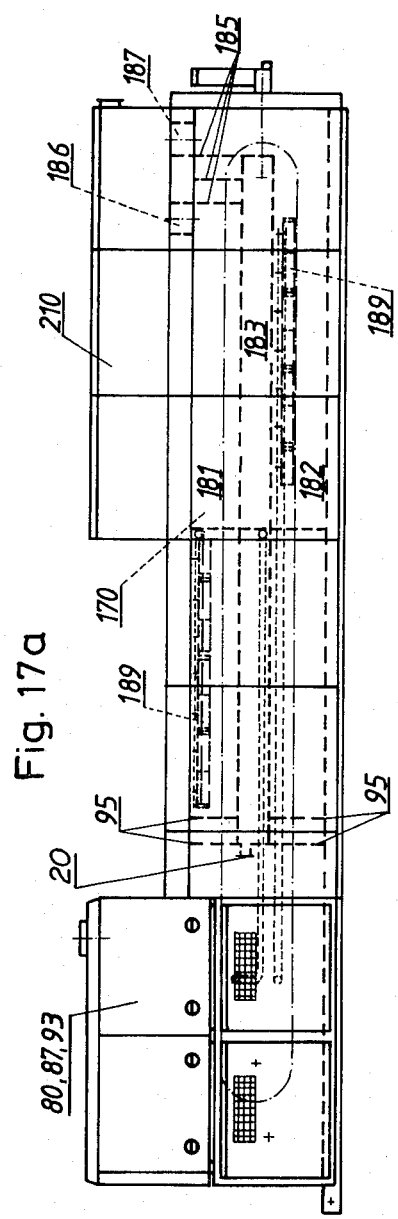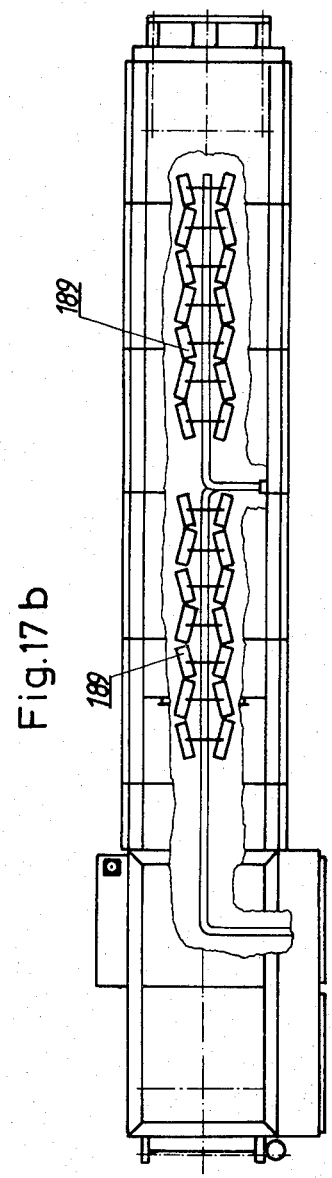

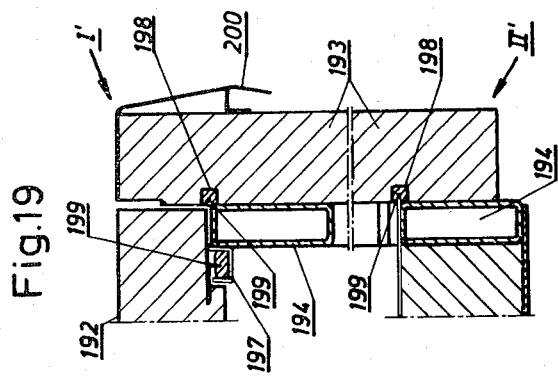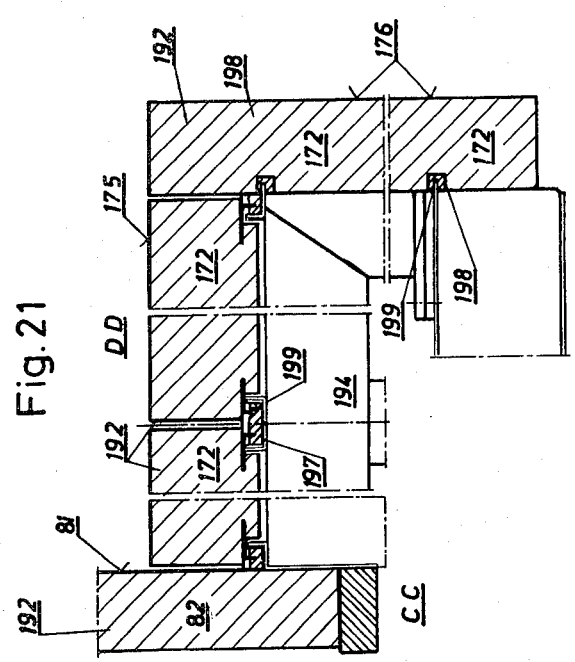

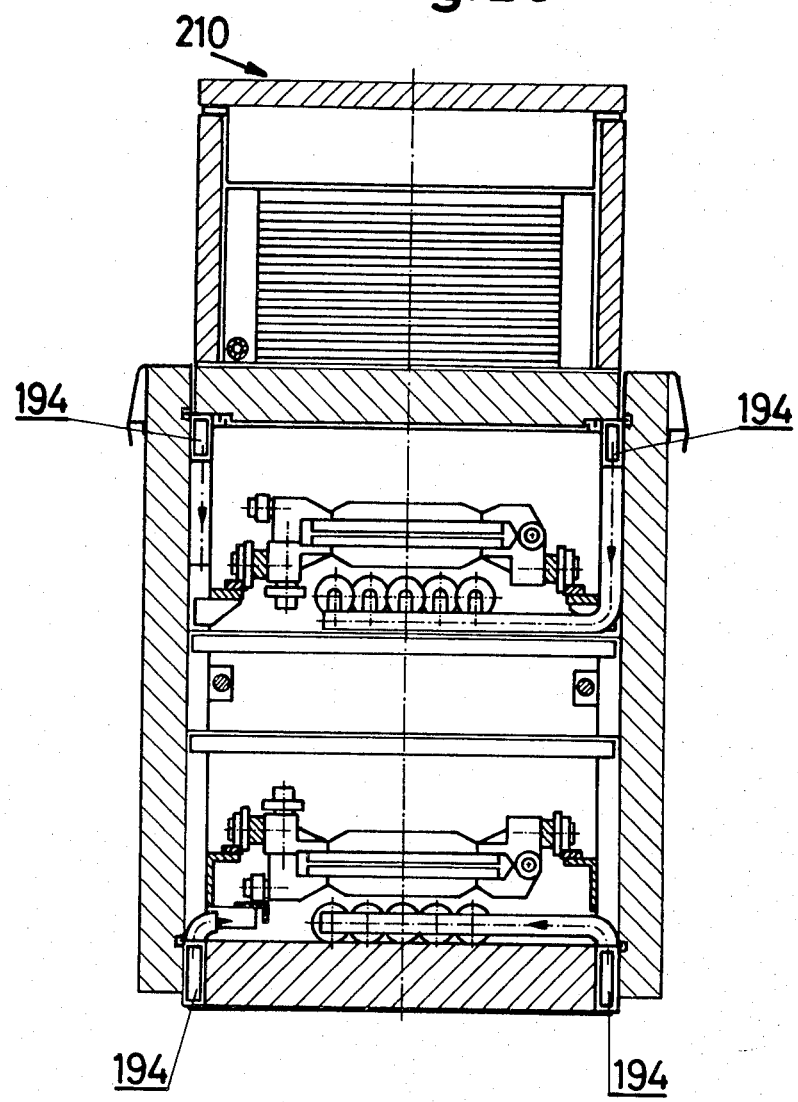

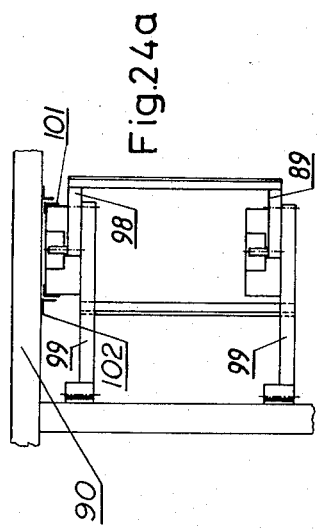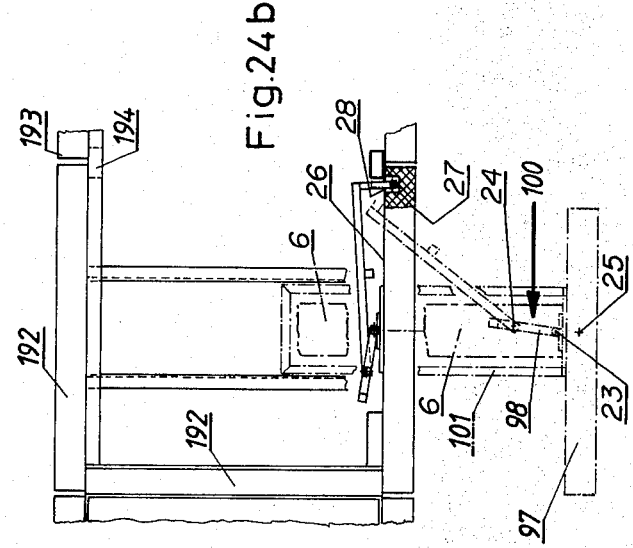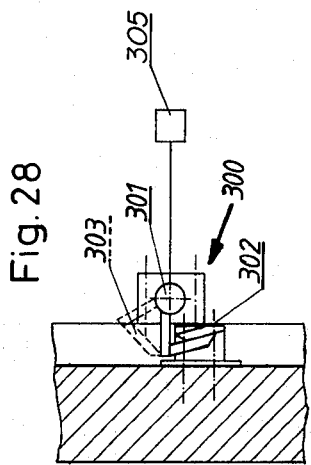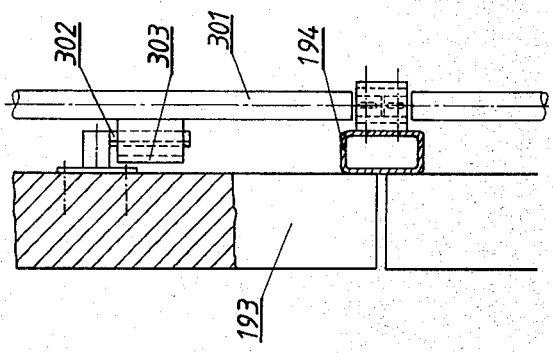

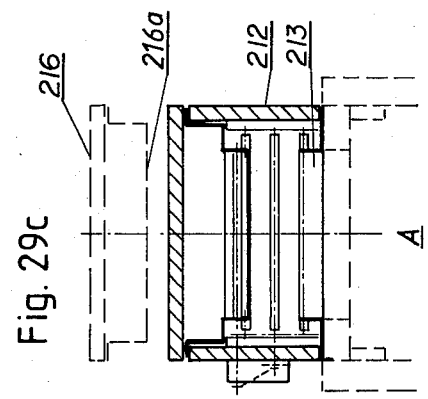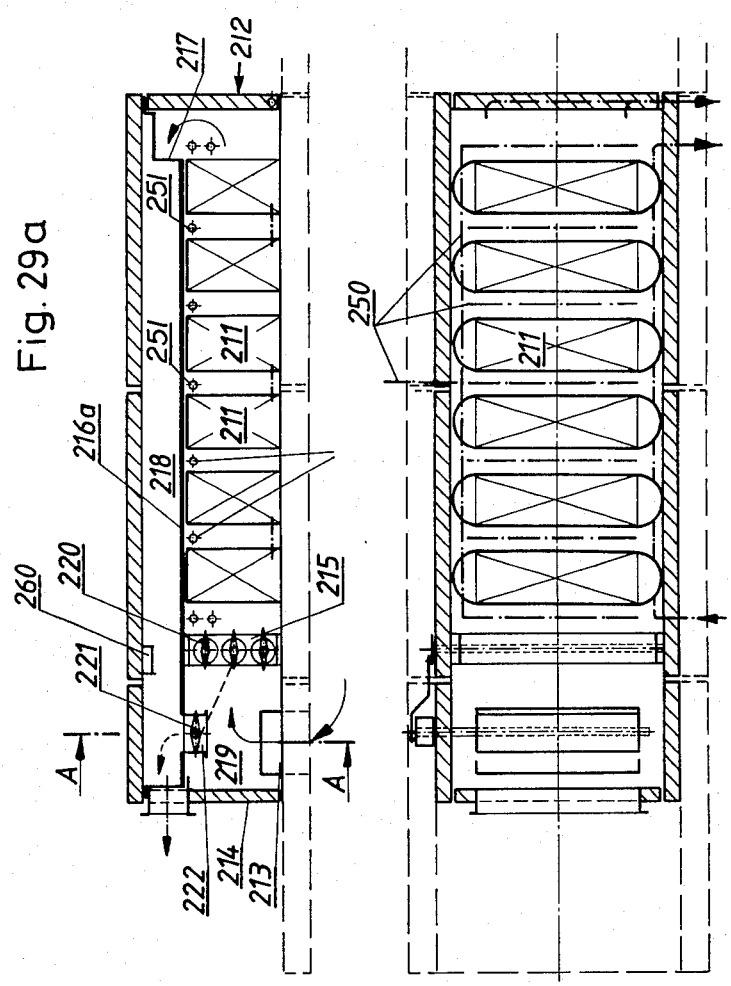

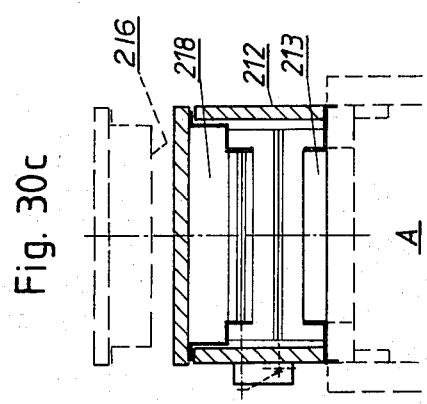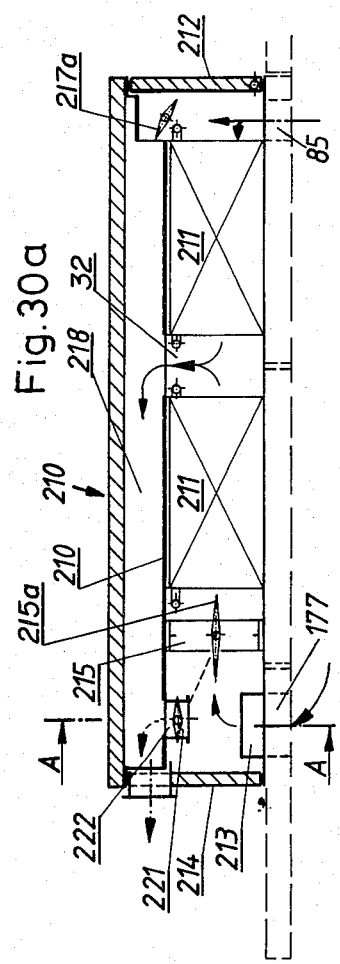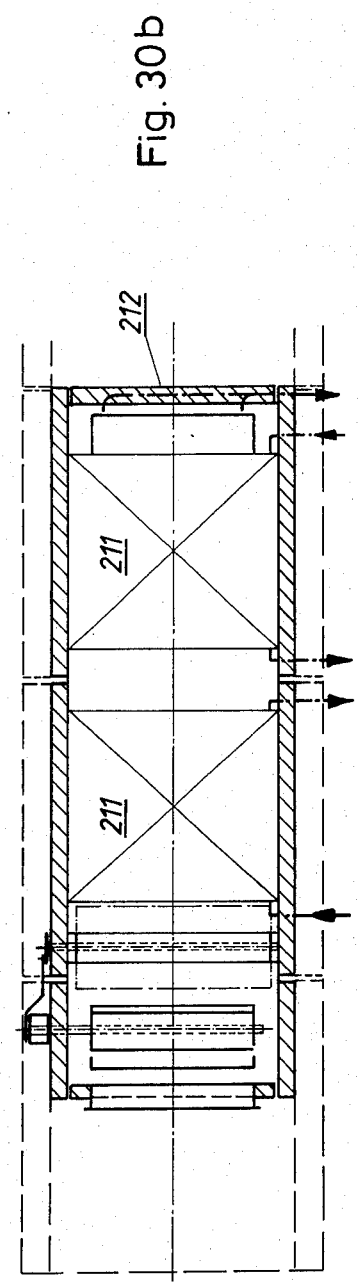

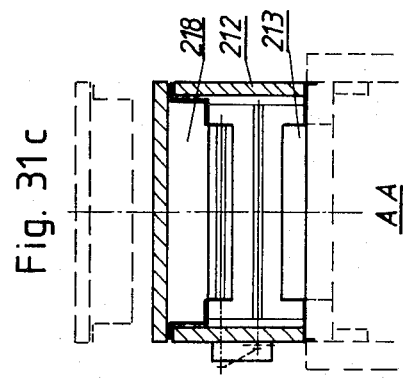
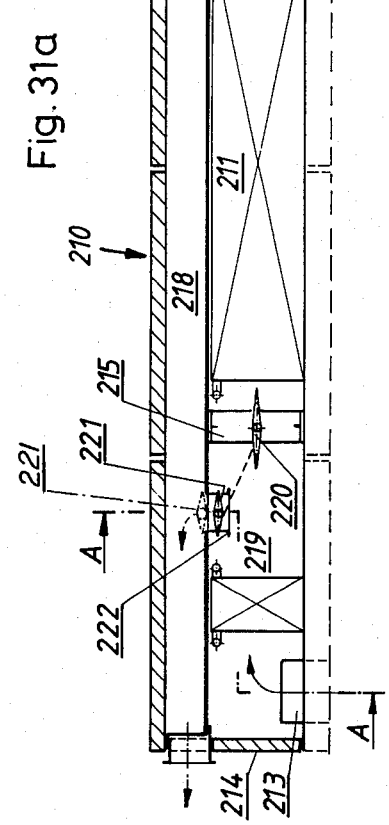
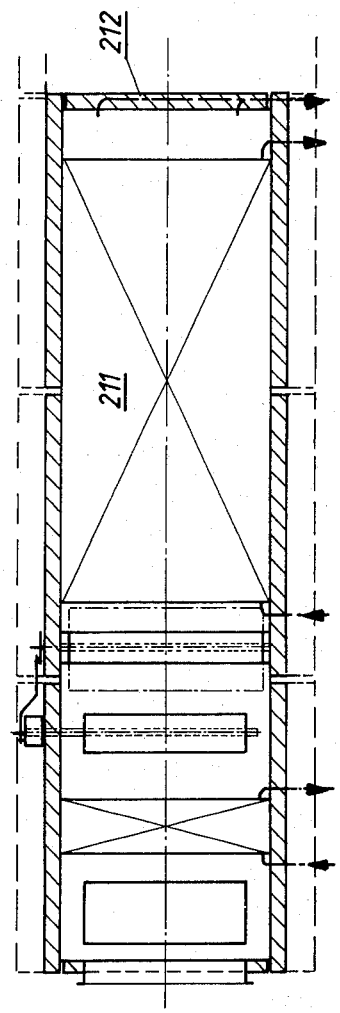

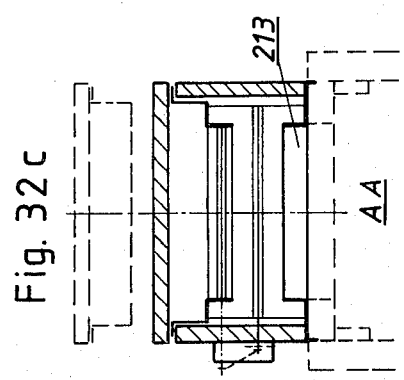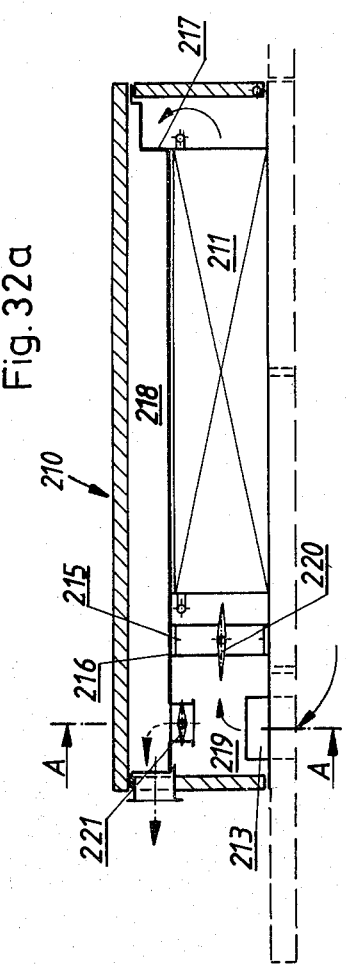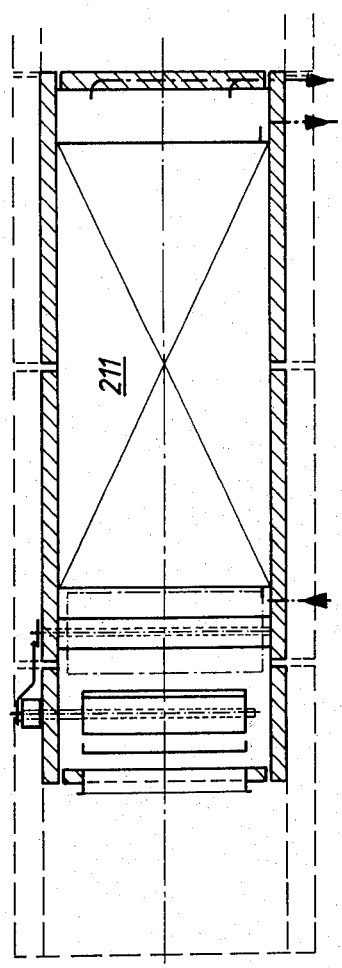

WAFER BAKING OVEN

BACKGROUND OF THE INVENTION

1. Technical Field of the Invention

The invention concerns a wafer baking oven in particular for flat wafers, low hollow wafers, sugar cones, wafer cups and wafer figures.

2. Description of the Prior Art

Different machine-made wafer or waffle products are known in the food and confectionery industries. These products are marketed in the filled or unfilled state and are generally known as confections. They may include, for example, wafer cones, wafer cups, wafer plates, flat wafer disks, low hollow wafers, wafer cookies, wafer rolls, ice cream cones, filled wafers, small filled wafer bars, wafer sections and the like. These wafer products are bakery items of a crisp, crunchy, brittle and fragile consistency.

The different individual wafer products may be prepared in different ways. In producing certain wafer products, the batter is baked in its final form to make products such as, for example, wafer cones, wafer cups, wafer disks, low hollow wafers, and the like.

In producing other wafer products, a wafer sheet of an endless wafer strip is first baked and then shaped into its final configuration while still in a soft baking state. The wafer product is then cooled and given its crisp, brittle consistency. Examples of this type of product are sugar cones, hollow wafers, sugar wafer rolls, and the like.

In the preparation of still further types of wafer products, several sheets of wafers are baked, cooled, covered with cream and stacked to form a block of wafers. This cream-filled wafer block or wafer sandwich is subsequently cut into small, handy pieces, packed into units of one or several pieces, possibly in an air tight manner, and distributed.

The various wafer products may be provided with coatings, depending on the product. This may include, for example, sugar or chocolate. It may also include different fillings such as, for example, ice cream, various creams, chocolates or the like.

A distinction should be made between these wafer or waffle products and the waffles usually baked in the home in waffle irons, representing a soft, roll or pancake-like baked product. These waffles produced in the home are not similar in any way in respect to their consistency and their applicability to the aforedescribed wafer products of the wafer industry.

Industrially produced wafers, baked already in their final form such as, for example, wafer cones, wafer cups, wafer figures, etc., and the individual wafers which are combined into wafer products after having been coated with a cream such as, for example, flat wafers, wafer sheets, low hollow wafers and the like, are produced in wafer baking ovens.

Wafer baking ovens are in most cases operated in a fully automatic manner, whereby liquid batter or dough is poured into wafer baking molds corresponding to the type of wafer desired. The molds pass through a baking chamber and the ready baked wafers are removed from the molds in the soft baking state following the passage of the baking period. The wafer baking molds are arranged in opening and closing baking tongs having upper and lower sections, one of which may be moved relative to the other, which tongs traverse the wafer oven by traveling from one end to the other and which are opened and closed in the front port preceding the wafer oven for the pouring of the batter or dough and removal of the individual wafers.

The wafer molds arranged in the baking tongs have different configurations in accordance with the type of wafer to be produced in the wafer mold. Thus, the wafer mold for the baking of wafer sheets or low hollow wafers consists of two baking sheets that are essentially flat with the exception of the pattern for the wafer sheets or the recesses for the low hollow wafers, in which case the sheets are equipped with lateral ledges to laterally close off the cavity existing when the wafer mold is closed. For other types of wafers, for example, for wafer or sugar cones, the baking mold consists of a two-part insert, one part being provided with recesses for the wafer cones and representing a female die, and the other part representing a male die entering the recesses of the female die in the closed state of the mold.

The parts of the wafer molds are arranged in the baking tongs so that, upon the opening of the baking tongs, the wafer molds also open for inserting the batter or removing the wafers. Thus, for example, in the case of a wafer baking mold comprising two wafer baking sheets, one of the baking sheets is arranged in the bottom part of the tong and the other in the top part of the tong. In a baking mold for wafer cones, the female die with its opening mechanism is arranged in the bottom part and the male die is arranged in the top part of the tongs. The opening of the baking tong is effected either by a mutual pivoting of the two parts of the tong around a common axis or by the lifting of one part of the tong from the other.

In the known wafer ovens or automatic wafer baking machines the individual baking tongs are lined up in a chain of tongs. The chain of tongs is arranged in the baking chamber and one end of the chain of tongs protrudes from one end of the chamber. In the area of the end of the chain of tongs protruding from the baking chamber, the batter charging station and the wafer discharge station are arranged. Together, the batter charging station and wafer discharge station form the front port of the wafer oven. The baking chamber of known wafer ovens is equipped at least over part of its length, with heating elements. The baking chamber is also surrounded by jacketing which, at least in part, is thermally insulated. This jacketing is equipped in part with doors, and the jacketing has a plurality of slots or orifices for the entry of combustion air to supply the heating elements arranged in the baking chamber. Combustion air enters the inside of the baking chamber primarily through the bottom area of the wafer oven which is open in the downward direction.

During the operation of the wafer baking oven, batter is placed in the open wafer molds in the front port, at the charging station, whereupon the molds are closed and transported in the closed state into the baking chamber. The batter in the molds is then baked during the passage of the mold through the baking chamber.

After the baking period, the closed wafer molds are transported from the baking chamber into the front port to the wafer discharge station. There, the baking tongs and the molds are opened, and the wafers are taken from the wafer oven. During the subsequent closing of the wafer molds at the charging station and during the baking process in the baking chamber, the water present in the batter evaporates as steam. This must be removed from the region of the front port and, together with the baking gases, from the baking chamber. In the known wafer ovens, this is effected in the region of the front port simply by opening a vapor exhaust. In this way, steam is removed from the baking chamber together with the baking gases and the combustion gases of the heating elements. In the process, in order to prevent the escape of the steam and the baking gases through the slots in the jacketing or through the downwardly open part of the baking chamber or through the end of the baking chamber open toward the front port, a volume of gas is exhausted which is substantially larger than is necessary for the removal of combustion and baking gases and of the steam. The volume of air required for this purpose is additionally suctioned in through the openings of the baking chamber and heated in the chamber or mixed with the hot atmosphere of the baking chamber, and then it is exhausted by way of the baking chamber exhausts. The volume of gas exhausted corresponds to 3 to 5 times the volume of the gases generated in, and to be exhausted from, the oven and the area of the front port.

In the known wafer baking ovens, an essential disadvantage resides in the fact that the additional volume of air exhausted with the baking gases, which consists essentially of steam and combustion gases and which is suctioned into the baking chamber, cools the wafer molds adjacent the inlet location. This air must itself be first heated to the temperature of the baking chamber. In order to prevent a harmful effect on the wafers in the molds from the cooling process of the molds, it is necessary to heat the baking molds, on the one hand, and the atmosphere of the baking chamber, on the other hand, to a temperature higher than required for the baking process itself. A further disadvantage is that, for the heating of the additional volume of air, a high heating capacity must be provided in the baking chamber. Furthermore, for exhausting the steam, the baking gases, the combustion gases and the additional volume of air, the blower installed in the exhaust of the baking oven must be of high capacity.

SUMMARY

It is therefore the object of the present invention to eliminate the abovedescribed disadvantages and to provide an energy saving wafer baking oven, requiring a lower installed burner capacity and a reduced blower capacity.

The object of the invention is attained by beginning with a wafer baking oven particularly for flat wafers, low hollow wafers, sugar cones, wafer cups, and wafer figures, equipped with a preferably and essentially ashlar or block-shaped baking chamber (i.e., a chamber having the general shape of an elongated parallelepiped) provided with a plurality of heating elements, with an exhaust, with jacketing having at least a partial thermal insulation, and with a front port arranged at the front end of said baking chamber. The front port comprises a charging and a discharge station and an exhaust, together with revolving baking tongs passing through the front port and said baking chamber. The baking tongs are opened upon passing through the front port for the removal of wafers and closed following the insertion of the batter. Subsequently, the baking tongs pass through the baking chamber in the closed state. According to the invention, the jacketing or enclosure for the oven is equipped with thermal insulation. It substantially completely encloses at least the baking chamber on its two lateral walls, at its ceiling wall and at its rear frontal wall, with the exception of one or several exhaust openings. Thus, at least the baking chamber is substantially completely enclosed even on its bottom side, and preferably in a thermally insulated manner. In this regard, the baking chamber may be closed with respect to the front port by a bulkhead partition equipped with passage openings for the baking tongs.

It is advantageous that, by means of the essentially complete enclosure of the baking chamber by the jacketing, the volume of gas to be exhausted from the baking oven may be substantially reduced, as the additional volume of air to be suctioned in through the slots of the enclosure is eliminated by the absence of said slots. It is also advantageous that, not only is it possible to reduce the exhaust capacity, but it is also possible to reduce the capacity of the heating elements installed in the baking chamber, since the need for both the heating of the additional air intake and the raising of the baking chamber temperature on account of the additional air intake are eliminated.

A further characteristic of the invention provides that the enclosure equipped with thermal insulation also surrounds the front port in an essentially complete manner, with the exception of a preferably self-closing wafer outlet opening and with the possible exception of one or several exhaust openings and an outlet orifice for baking wastes. It is advantageous that, not only is the baking chamber itself essentially completely enclosed by the enclosure, but also the front port is substantially completely enclosed. Thus, a wafer oven is created which is completely enclosed with the exception of the absolutely necessary openings.

This configuration renders possible a further reduction in exhaust capacity by the amount heretofore required for the exhaust of the front port area in order to prevent the escape of steam from the front port to the extent possible. Additionally, maximum sound attenuation of the entire baking oven is attained. Furthermore, the radiation of heat from the area of the front port into the surrounding environment is prevented.

According to a further characteristic of the invention, the enclosure on one of the lateral walls has the configuration of a door at the front port. This door carries a batter pouring installation. Preferably, the door is pivotable into a position approximately perpendicular to the running direction of the baking tongs and into a position parallel to the running direction of the baking tongs. In this manner, the wafer oven is closed at the batter pouring installation, on the one hand, and good accessability of the batter pouring installation is assured, on the other hand.

A further characteristic of the invention resides in the fact that the enclosure consists, at least in part, of individual panels or doors ("panel" is sometimes used generically herein to refer to panels or doors). The panels are fastened, preferably in a removable manner, to a supporting oven frame, and they adjoin each other. The plates or doors are sealed in their edge areas against each other and/or against the oven frame. This configuration insures optimum accessability of the inside of the oven in all necessary locations.

The invention further provides for an oven frame structure consisting of profiled tubes, part of which tubes are designed as the transport line for the gas-air mixture to be supplied to the heating element and possibly another part as the transport line for the secondary air to be supplied to the heating elements. This configuration makes it possible to also provide the part of the wafer oven at which the supply lines for the heating elements are led into the baking chamber with a removable, thermally insulated panel or door section of the enclosure. This eliminates the passage openings heretofore required for the supply lines and therefore also eliminates another possible air leak.

In order to assure the complete sealing of the enclosure, a further characteristic of the invention provides that the seals between the panels and/or doors as well as the seals between the panels and/or doors and the oven frame are laid out in the form of labyrinths.

Furthermore, each of the gaskets for the seals may be formed by a ledge protruding into a C beam or a groove.

In order to prevent the passage of air or gas through the seals, the invention provides alternatively that a heat-resistant gasket material is arranged inside the C beam or the groove, against which material the ledge abuts or engages in the closed state of the doors or with the panels assembled in place.

According to a further characteristic of the invention, the doors and/or plates of the enclosure may be bolted from the inside in the closed or inserted state, with the bolting device being remotely controlled by a remote operator in the case of at least part of the doors or plates, preferably by electrical or pneumatic means. This prevents the unintentional opening or removal of parts of the enclosure during the operation of the wafer oven.

It is further insured that the baking atmosphere in the baking chamber is maintained during the entire operating period of the wafer oven and that access to the inside of the baking chamber is possible only when the locking of the door or panel, that must be opened or removed, is released. This is of primary importance because, in the case of an essentially completely closed baking chamber and the reduced burner and exhaust capacities made possible by it, the simultaneous opening or removal of several doors or plates affects the temperature of the baking chamber more so than in known wafer ovens. In the latter ovens, the burner and exhaust capacities are designed for larger volumes of supplemental air. In addition, this locking device prevents the opening of the baking chamber by unauthorized operating personnel, thereby preventing interference.

A further characteristic of the invention provides that the partition between the front port and the baking chamber is equipped with two vertical sections containing a passage opening for the baking tongs, wherein the section of the partition containing the passage opening coordinated with the upper track of the baking tongs is set back, i.e., offset, with respect to the section of the partition associated with the lower track of the baking tongs. This configuration makes it feasible to reduce the volume of steam generated in the baking, as a large portion of the steam is generated immediately following the closing of the baking tongs and thus of the wafer molds. In this regard, each baking tong does not leave the front port on its upper track immediately following the insertion of the batter into the wafer mold and the subsequent closing of the baking tong. Rather, each baking tong enters the baking chamber of the wafer oven only when it has passed the passage opening of the set back section of the partition.

A further characteristic of the invention resides in the feature that the passage openings for the baking tongs have a configuration corresponding essentially to the cross section of a baking tong perpendicularly to its running direction. This assures that the atmosphere in the front port is extensively kept apart from that of the baking chamber. The cross section of the baking tongs perpendicular to their running direction is defined herein as the cross section of all of the parts which move along with the baking tong on its track, i.e., the cross section both of the wafer molds and the baking tong itself and of the conveyor installation for the baking tongs, for example, a conveyor chain.

Depending on the configuration of wafer baking molds contained in a baking tong, according to a further characteristic of the invention, it may be provided that the cross section of the passage opening for the baking tongs is larger than the cross section of the baking tongs perpendicular to their running direction by 1% to 25%, and preferably by 5%.

In order to achieve a separation of the atmosphere of the front port and the baking chamber from each other as completely as possible, the invention provides for gaskets, preferably in the form of labyrinths, in the passage openings for the baking tongs.

This gasket for the passage openings for the baking tongs may, according to a further characteristic of the invention, consist of glass fiber curtains or brushes, or the like.

According to another characteristic of the invention, the labyrinth seal for the partition between the front port and baking chamber consists of several vertical bulkhead sheets forming at least part of the partition. In this manner, the sealing of the passage openings for the baking tongs may be provided by the structure of the partition itself, whereby an especially simple configuration is obtained.

The invention further provides that, in the case of a wafer oven, particularly for flat wafers or low hollow wafers, the sum of the cross sections of the air inlet openings, especially in the front port, corresponds to at least 0.01 times, preferably 0.3 times, the format of the wafer sheet, the "format" corresponding with the largest area of the silouette of the wafer. In this manner, the air inlet openings are restricted to dimensions serving to merely maintain a slight underpressure in the wafer oven.

The volume of gas or steam to be removed from the front port also depends on the number of tongs of the wafer oven. That is, when the same product is baked in two ovens of different sizes but with the same baking period, the amount of steam generated will depend on the number of tongs. In an automatic wafer baking machine having twice the number of tongs, a double volume of batter must be processed. To take this into account, it is further provided in the invention that the sum of the cross sections of the air inlet openings, in particular in the front port, corresponds to at least 0.01 times, to a maximum of 0.4 times, the product of the wafer format (as defined above) and the number of baking tongs in the wafer oven. This ensures that the air inlet opening will not be larger than absolutely necessary.

In a further embodiment of the invention, the sum of the cross sectional areas of the air inlet openings, in particular in the front port, corresponds at the maximum to 0.03 to 1 times, and preferably 0.3 times, the product of the wafer format (as defined above) and the maximum number of baking tongs in the front port. This is especially advantageous in the case of multiple part wafer molds.

It is further conveniently provided that a preferably two-stage exhaustor is connected to the exhaust of the front port, which exhaustor is capable of exhausting 50 to 400 times the volume of the front port per hour. In this manner, all of the steam generated in the front port may be exhausted.

A further characteristic of the invention resides in the fact that the exhaustor may be actuated by the opening of a door in the enclosure within the area of the front port. This assures that the operator is protected against the steam present in the front port and against the thermal radiation emanating from the baking tongs.

According to a further characteristic of the invention, it is provided that, in the case of a two-stage exhaustor, the first or lower stage exhausts at least the steam generated during the pouring of the batter in the front port, and the second or higher stage, which is preferably actuable by the opening of a door in the enclosure within the area of the front port, exhausts an additional volume of air, thereby reducing the temperature in the front port to a level acceptable to the operating personnel. By means of this arrangement, the volume of steam generated in the front port during the operation of the wafer oven is exhausted, on the one hand. On the other hand, the safety of the operating personnel is ensured when opening a part of the enclosure, for example, for maintenance purposes, by the higher stage of the exhaustor which exhausts a substantially greater volume of air.

In a further embodiment of the invention, a heat recovery installation is preferably connected to, preferably in a bypass, to the exhaust of the front port to condense the steam generated during the pouring of the batter. It is advantageous here that the heat leaving the front port through the exhaust may be recovered, both from the steam exhausted and the baking gases removed. With the aid of the heat recovery installation, for example, hot water may be produced, which water is then available for the heating of creams or chocolate for the coating of wafers produced in the wafer oven.

According to a further characteristic of the invention, at least one discharge spider is provided. The discharge spider is preferably driven synchronously with the revolving baking tongs and revolves in a vertical plane. This assures, on the one hand, the safe removal of the wafers discharged from the open baking tongs at the discharge station and, on the other hand, reduces the gap required for the removal of the finished wafer sheets in the enclosure to a minimum.

In order to prevent tilting, particularly in the case of flat wafers, during their removal by the discharge spider, the invention provides, laterally to the discharge spider or spiders, on either side, a guide for the wafers. Preferably, the guides revolve synchronously with the spider and limits the path of the wafers. The guides ensure that the flat wafers remain located entirely within the discharge spider.

In order to be able to adjust the guides for different wafer formats, the mutual axial distance between the guides is adjustable.

Conveniently, the two guides may be mounted on the shaft of the discharge spider, preferably adjustably. Alternatively, the two guides may be located separately from the discharge spider in the front port and may be driven more rapidly than the discharge spider.

In a further development of the invention, an upper directing guide is provided in the front port and above the outlet opening for the wafers. The upper directing device limits the path of the wafers in the upward direction and guiding the wafers to the outlet opening. This results in the advantage that, especially in the case of flat wafers, there is an assurance that the wafers will be guided to the outlet opening, even when they are ejected very late from the open baking tongs.

Appropriately, the upper directing device is in the form of a guide surface extending from the upper frontal wall of the enclosure into the area above the discharge spider.

Further, according to the invention, pivoting lateral directing devices, or guides are provided on both sides of the path of the wafers coming from the front port. These lateral directing devices penetrate through the outlet opening for the wafers and are capable of pivoting around an axis perpendicular to the path of the wafers. In this manner, it is assured that the wafers cannot adhere laterally upon exiting from the wafer oven. This is because the wafers are released by the pivoting lateral guides, even though they may be destroyed in the process.

Conveniently, the pivoting lateral directing devices or guides have a section extending ogliquely to the longitudinal center axis of the path of the wafers. By means of this arrangement, a gradual aligning of the wafers, and specifically an aligning symmetrically to the longitudinal center axis of the wafer path, is achieved.

A further characteristic of the invention resides in the fact that the pivoting lateral guides are provided with swivelling axles or axes at their forward end as viewed in the transport direction of the wafers. A section parallel to the path of the wafers extends from the axles and an oblique section is joined to the parallel sections. This aspect of the invention makes possible a particularly careful handling of the wafers to be aligned, especially of their corners and edges.

Advantageously, according to a further characteristic of the invention, the pivoting lateral directing devices or guides abut, with their ends which are opposite to the swivelling axles, against the rotating lateral guides, while the rotating lateral guides are equipped with projections distributed over their circumference. These projections move the pivoting lateral guides back and forth during the turning of the rotating lateral guides. It is advantageous that the pivoting lateral guides are activated directly by the rotating guides.

Alternatively, at least one of the pivoting lateral guides may rest against a rotating eccentric, the rotating axis of which is perpendicular to the wafer path.

By means of this configuration, the swivelling motion of the pivoting lateral directing devices or guides may be varied independently of the rotating lateral guides. The pivoting lateral guides may be moved forward into the area of the discharge spider or the baking tong chain and may be approximately as large in this area as the rotating lateral guides so that the latter may be eliminated.

A further characteristic of the invention resides in the fact that the baking chamber has two baking chamber sections, arranged over each other, traversed by the baking tongs and separated at least in part by a horizontal intermediate space from each other. The baking chamber sections communicate with the front port at their front ends by means of a passage opening for each of the baking tongs. Heating elements are arranged in the two baking chamber sections, and at least one baking chamber exhaust is arranged in the baking chamber sections. This configuration results in an improved utilization of the energy emitted by the heating elements, whereby a more uniform heating of the baking tongs is assured and a reduction in the capacity of the installed heating elements is made possible. Additionally, the volume of the baking chamber to be heated is reduced.

A further characteristic of the invention resides in the fact that the two heating chamber sections are connected with each other at one of their ends and separated at the other, with the upper baking chamber sections being connected in the area of the separate ends with the baking chamber exhaust.

This leads to a particularly favorable utilization of the energy introduced by the heating elements into the baking chamber sections. Specifically, a forced flow of the heating or baking gases is established from the heating elements through the baking chamber sections along the baking tongs to the baking chamber exhaust.

In a further development of the invention, in the case of baking chamber sections connected with each other at their rear ends, the baking chamber exhaust arranged in the area of the forward end of the upper baking chamber section represents the only baking chamber exhaust effective during the operation of the wafer oven. In this embodiment, the steam and the baking gases, and possibly the combustion gases, generated during the baking process are exhausted from the entire internal space of the wafer oven through the exhaust located at the forward end of the upper baking chamber section. In this manner, the steam generated in the front port is suctioned over the shortest possible path to the baking chamber exhaust.

A further characteristic of the invention resides in the fact that the intermediate space separating the two baking chamber sections extends only over a part of the length of the baking chamber. Also, the upper baking chamber section is closed off at its rear end (i.e., the end opposite to the front port) by a partition equipped with a passage opening for the baking tongs, with both sections being provided with its own exhaust. This results in the advantage that the two baking chamber sections are completely separated from each other. Thus, both the separate control of the heating elements and the baking temperature in each baking chamber sections and also the separate recovery of heat from the baking gases are made possible.

Advantageously, according to a further characteristic of the invention, in both of the baking chamber sections the heating elements are arranged over only part of the length of the baking chamber. This arrangement makes it feasible to further reduce the heating capacity of the heating elements of each of the baking chamber sections, since the baking atmosphere heats the baking tongs even in the parts of the baking chamber section not equipped with heating elements.

Appropriately, in a further development of the invention, the heating elements in the upper baking chamber section are arranged in its rear area, and the heating elements in the lower baking chamber section are arranged in its front area. In this case, the baking sections are interconnected by their rear ends and the baking chamber sections are separated from each other. It then becomes possible to arrange the baking chamber exhaust or exhausts at the end opposite to the end wherein the heating elements. With this arrangement, the baking tongs have been well heated prior to their entry into the front port. In the process, the baking atmosphere generated by the heating elements is conducted in each of the baking chamber sections away from the heating elements, along the path of the baking tongs, to the baking chamber exhausts.

According to a further characteristic of the invention, the hot gases are conducted conveniently in both of the baking chamber sections against the running direction of the baking tongs to the exhausts.

In a further embodiment of the invention, the heating elements are infrared radiators operated by electric current or gas. The use of infrared radiators as heating elements results in the heating of the baking tongs primarily by radiant heat. It is therefore possible to move the heating elements closer to the track of the baking tongs and to thus further reduce the volume of each baking chamber section, thereby conserving energy. The use of infrared gas radiators, as compared with gas flame burners, leads to the further advantage that no secondary air supply is required, and thus there is no need for openings or lines for secondary air.

The invention further provides for the arrangement of the heating elements in the form of infrared radiators both above and below the track of the baking tongs in each baking chamber section. This renders it possible to heat the wafer molds located in the baking tongs directly by radiant heat to the baking temperature required for the type of wafers involved.

It is further provided by the invention that at least one heat recovery installation is connected to the baking chamber exhaust or exhausts, preferably in a bypass, wherein the steam generated during the baking process is preferably condensed. In this manner, the heat contained in the waste gases leaving the baking chamber through the baking chamber exhausts may be utilized, for example, for the processing of creams or the heating of the surrounding room containing the wafer oven.

Another characteristic of the invention resides in the fact that the heat recovery installation comprises a heat exchanger set upon the ceiling wall of the baking chamber, the heat exchanger being connected through a bypass with the baking chamber exhaust and possibly with the exhaust of the front port. In this manner, in addition to a compact layout, the shortest possible flow path is created for the exhaust gases leaving the baking chamber and the front port. Thus, the amount of heat to be recovered from the exhaust gases, especially if the steam contained in the exhaust gases is condensed, is optimally large. Furthermore, this aspect of the invention in combination with the layout of the heating elements as infrared radiators, results in a particularly large recovery of heat, since the proportion of steam in the exhaust gases is substantially larger than in the case of heating elements requiring a supply of secondary air.

In a further development of the invention, the heat exchanger has a tub-shaped lower or bottom part, in which the heat exchanger element or elements are arranged and which is equipped with a preferably closable inlet opening in its forward frontal side. The inlet opening is for the gases exiting from the baking chamber and/or the front port through the exhausts. The tub-like lower part is closed on top by a cover wall and provided at its rear end (i.e., the end adjacent the rearward side of the heat exchanger) with a gas outlet opening, possibly connected with an exhaust channel. The tub-like configuration of the bottom part containing the heat exchanger element or elements makes possible a simple but thorough cleaning of the heat exchanger element or elements by means of spraying with water or brushing, wherein the dirty cleaning water is collected in the tub-like lower part and removed from the latter through a drain opening. The easy cleaning of the heat exchanger element or elements is necessary, because the exhaust gases leaving the baking chamber contain very fine batter particles and soot, which contaminate the heat exchanger element or elements, especially during the condensation of steam. This increases the flow resistance of the heat exchanger.

It may be further provided according to the invention that the tub-like lower part of the heat exchanger is closed on top by a removable cover, with a gas return channel being arranged on the bottom side of the cover. The gas outlet orifice of the bottom part opens into the gas return channel. A lower boundary wall of the removable cover forms the ceiling wall which closes off the tub-like bottom part. The gas return channel opens to the outside on the forward frontal side of the heat exchanger. Thus, on the one hand, easy accessability of the heating element or elements for cleaning or the like is assured and, on the other hand, the arrangement of a bypass is substantially facilitated, since the gas inlet and gas outlet openings of the heat exchanger are arranged at one end of the heat exchanger.

Advantageously, the bypass may be effected within the heat exchanger, with a bypass chamber being formed in the tub-shaped part of the heat exchanger. The baking exhaust and/or the front port exhaust open into the bypass chamber. The bypass chamber is separated from the heat exchanger element or elements by a wall preferably equipped with a closable bypass opening and with a preferably closable bypass exhaust opening. The bypass exhaust opening is provded in the ceiling wall of the tub-shaped bottom part above the bypass chamber. A heat exchanger laid out in this manner may have the configuration of a separate structural unit and mounted directly on the wafer oven, or it may be connected with one or several exhausts as a single unit.

The invention further provides that the exhaust opening of the bypass chamber opens into the exhaust gas return channel. A preferably adjustable butterfly valve is arranged in the exhaust gas return channel or in the exhaust opening of the bypass chamber. The volume of exhaust gas flowing through the heat exchanger may thereby be controlled so that the heat exchanger may be regulated both in relation to the volume of gas flowing through it and the temperature of the heat transfer fluid which receives the heat transferred by the heat exchanger. This is of primary importance when the volume of gas exiting from the wafer oven varies as the result of varying operating conditions, for example, upon the opening of the closed front port. For reasons of safety, additional air is suctioned at that time, and the exhaust gas volume and its temperature are both changed. Changes in the volume of exhaust gas flowing through the heat exchanger may also be caused if several wafer ovens are connected to it, the operations of which are not synchronous.

In a further development of the invention, a cleaning installation consisting preferably of one or several pipes equipped with spray nozzles is provided for the heat exchanger elements in the tub-shaped lower part of the heat exchanger. It is advantageous that, to clean the batter and soot particles carried by the exhaust gas of the heat exchanger, the cleaning installation may be activated from the outside when the heat exchanger is closed. In this way, a decrease in the efficiency of the heat exchanger due to dirt may be prevented.

Conveniently, in the heat exchanger or in the gas return channel, a device to measure negative pressures is arranged. This device emits a signal to regulate the bypass via its closing or butterfly valves, and to control the cleaning installation of the heat exchanger. Upon the contamination of the heat exchanger, the pressure drop in the heat exchanger increases. According to the invention, when this happens, the bypass may be opened at a given degree of contamination and the cleaning installation may be actuated.

According to a further characteristic of the invention, a display device is provided for the surveillance of the wafer oven, upon which the baking tongs or their path is represented by means of lamps or a digital display. Preferably, a sensor is arranged in the front port to indicate the presence of undischarged wafers remaining in a baking tong beyond the discharge station. This is necessary, particularly in wafer ovens operating at high revolving velocities, since the absence of a wafer from a row of successive wafers coming from the front port is easily overlooked and it is difficult to determine which of the baking tongs the missing wafer has adhered to.

In order to determine the baking tong in which the discharged wafers were baked, another characteristic of the invention provides that, for the correlation of the baking tongs with the wafers baked in them, both the baking wafers or the tong carriages and the wafer molds used in them are marked with the same symbol or number, both of which are sometimes generically referred to herein, with the numbers or symbols provided on the wafer molds preferably being pressed or stamped in one of the batter treating sides of the molds as a mirror image. This configuration, according to the invention, makes it possible to determine, from the number of successive wafers corresponding to the number of baking tongs in the wafer oven, in which of the baking tongs the wafer remaining in the oven is located. Furthermore, it is not only possible to readily determine whether a baking tong, together with the wafer mold contained therein, must be realigned, but it is also possible to readily determine which baking tong is involved. This is accomplished by inspecting the wafers discharged from the wafer oven and noting the symbols thereon.

A further characteristic of the invention provides that, in the case of a wafer remaining in the baking tong at the wafer discharge station in the front port, the display device or digital display will indicate the symbol of the tong involved. This enables the operator to ascertain the adhesion of a wafer in a baking tong, without having to open the enclosure of the wafer oven in the area of the front port.

According to another characteristic of the invention, in the case of a wafer remaining in the baking tong at the wafer discharge station in the front port, the lamp correlated with the tong involved lights up. By this means, the instantaneous position of a baking tong in which a wafer has remained may be determined and monitored during the passage of the tong through the wafer oven so that, for example, when the tong involved is in the front port, the wafer oven may be arrested. In a further development of the invention, the display device has two parts. One part indicates in which of the baking tongs at the wafer discharge station a wafer or wafers have remained. The other part indicates which tong is located, at a particular moment, in the area between the wafer discharge station and the charging station and/or which tong is in the adjusting station for the tongs. The adjusting station is preferably located at the rear end of the wafer oven. It is possible by means of this two-part configuration of the display device to determine, firstly, in how many and in which of the tongs there are wafers remaining and, secondly, the time at which the baking tongs involved are in their open position in the front port.

By this means, the adhering wafer may be removed from the open baking tong, for example, by brushing, possibly after the front port has been opened. It is further possible to readily position individual baking tongs, for which there is a need to realign the wafer molds, at the adjusting station by stopping the wafer oven.

The invention appropriately provides that the second part of the display has an input device correlated with the baking tongs. The input device is connected with the control of the drive for the revolving baking tongs. Following the actuation of the part of the input device correlated with a baking tong, the revolving baking tongs may be arrested when the baking tong involved is located at the adjusting station or in the area between the wafer discharge station and the charging station. This renders it possible to place any tong desired, independently of the instantaneous position of the baking tongs in the wafer oven, at easily accessible locations while the wafer oven remains closed.

According to a further characteristic of the invention, the batter pouring installation is equipped with a batter reservoir, a pourer and possibly with at least one batter pump. The batter pouring installation includes two or more separate, preferably adjustable, batter pouring fluid circuits. Each batter pouring fluid circuit includes only a part of the batter pouring exit openings correlated with the wafer mold or molds arranged in a baking tong. It is advantageous that, if certain individual batter outlet openings of a batter pouring fluid circuit are impeded, the other batter pouring fluid circuit or circuits are not affected, i.e., that no more batter than usual will pour out of the latter as the result of the clogged opening. Also, in the case of the clogging of a batter exit opening, higher pressures will be generated in the affected batter pouring fluid circuit, which then eliminates the impediment.

The invention further provides that, in the case of wafer baking molds equipped with female and male dies, a separate batter pouring fluid circuit is provided for each depression of the female die. This makes it possible to control the supply of batter to each individual recess of the female die separately and thus to combine wafer molds of different sizes in one baking tong.

In a further development of the invention, in the case of wafer molds in the form of baking sheets, at least two batter pouring fluid circuits are provided for adjacent pouring areas, with each pouring area comprising one or several pouring strips. By means of this arrangement, the volumes of batter correlated with each of the pouring areas may be controlled independently of each other, so that inequalities in the pouring image of each wafer sheet may be equalized better.

According to another characteristic of the invention, in the case of wafer molds consisting of baking sheets, one of two batter pouring fluid circuits is correlated with the center pouring area, while the outer pouring areas on either side are correlated with the other batter pouring fluid circuit. Each of the pouring areas comprises one or several pouring strips. By means of this layout, the larger pouring volume desired in the outer pouring areas for a complete wafer sheet may be controlled independently from the pouring volume in the center pouring area. This results in a wafer sheet that is more homogeneous both with respect to its structure and its mechanical strength.

In a further development of the invention, a separate batter pouring fluid circuit is associated with each pouring strip in the case of baking tongs equipped with baking sheets. It is thereby possible to obtain wafer sheets with optimum homogeneity by suitably control of the batter pouring fluid circuits The invention further provides that each batter pouring cycle is equipped with a pressure line controllable by means of a control valve for the liquid batter. It is advantageous that, in case of displacement, bending of or damage to one individual batter exit opening of an individual batter pouring fluid circuit, clotting of the batter exit opening may be prevented by the pressure in the pressure line or eliminated by varying said pressure.

A further characteristic of the invention resides in the fact that each batter pouring cycle has only one batter outlet opening. With this arrangement, there is an advantage in that, with a suitable number of batter outlet openings or batter outlet cycles, especially in the case of flat wafers or low hollow wafers, a highly homogeneous pouring image may be obtained. This is because the proportion of batter directly adhering to or baking on the baking sheet compared with the proportion of batter that is distributed only upon the closing of the wafer baking molds by the steam generated over the batter treating surfaces of the baking sheets, is significantly larger than heretofore possible with batter pourers consisting of a single perforated pipe.

A disadvantage of batter pourers heretofore resided in the multiplicity of holes. The cross section of a batter outlet opening must not exceed certain dimensions, because otherwise a jet will be emitted from the hole and atomized on the baking sheet.

By virtue of a plurality of holes with minimum cross sections, the known pourers operate essentially without pressure, so that in case of the displacement of a hole, the rise in pressure is negligible and the hole remains closed. The pourer must then be replaced, leading to a loss of production. Also, due to the central feeding of the pourer, it has been necessary to keep the hole in the vicinity of the supply means smaller than in more remote locations, in order to ensure a uniform exiting of the batter.

All of these disadvantages are eliminated in the case of pourers according to the invention. In addition, in case of variations in the pouring image if, for example, not enough batter has been poured at a certain location of the wafer and as a result the wafer is translucent at this point, a homogeneous pouring image may be obtained by varying the pouring volume of a single batter pouring fluid circuit.

The layout of the batter pouring installation according to the invention substantially facilitates the adjustment of the wafer oven for different wafer batters and to different wafer molds. The pouring image may be evaluated by means of the wafers coming from the wafer oven. It may be varied by the simple control or variation of individual batter pouring fluid circuits and given the configuration desired. Heretofore, this has been the case since the pouring tube of the pourer was provided with new pouring holes to vary the pouring image, while the old ones were first closed. It has always been necessary to deactivate the wafer oven and to dismantle the entire pourer to accomplish this.

According to another characteristic of the invention, the mutual distance between the outlet openings is adjustable. The batter pouring fluid circuits may thereby be better adjusted to the wafer mold involved. The term "circuit" in the expression "batter pouring fluid circuit" is used in its broad sense to mean structure providing a certain route to travel. Obviously, batter passing through the batter pouring fluid circuits does not travel in a closed loop or circle.

The invention further provides that the parts of the pouring fluid circuits extending into the front port and which together forming the pourer are self-supporting and are preferably surrounded by a thermally insulated sleeve. It is advantageous that the self-supporting parts may be displaced to adjust the mutual distance of the batter exit openings. Additionally, especially with the front port closed, the thermally insulated sleeve of the self-supporting parts will minimize the effect of the radiating heat emitted by the baking tongs and by the molds on the liquid batter. This further prevents the formation of condensate water on the self-supporting part of the pourer.

According to a further characteristic of the invention, the parts of the pouring fluid circuits protruding into the front port are arranged in a common, self-supporting housing. This makes it possible to remove the pourer as a whole from the front port, for example, for pouring purposes. Furthermore, cooling conduits may be provided in the self-supporting housing for the liquid batter.

The self-supporting housing is appropriately thermally insulated.

Alternatively, the parts of the pouring fluid circuits arranged inside the housing may consist of pipes or hose, with heat insulation being provided between the pipes or hose, on the one hand, and between the pipes or hose and the wall of the housing, on the other hand. This configuration prevents the overheating of the liquid batter in the batter pouring fluid circuits and retards the formation of condensate water on the outside of the housing.

A further characteristic of the invention resides in the fact that the inside parts of the batter pouring fluid circuits which together form the pourer are arranged displaceably on the front port. By virtue of this layout, the pourer may be moved for a certain distance by the revolving baking tongs, with the batter pourer conveniently being displaceable in the revolving direction of the baking tongs.

In order to make possible the easy cleaning of the pouring fluid circuits and particularly of the pourer, the inside parts of the batter pouring fluid circuits which together form the pourer are, according to the invention, displaceable transversely to the running direction of the baking tongs.

According to a further characteristic of the invention, the parts of the batter pouring fluid circuits, together forming the pourer, are mounted on a preferably heat-insulated front port door. The front port door is arranged pivotably on the front port, with the control elements, e.g., the control valves, of the batter pouring fluid circuits or the batter pumps being located outside the enclosure. This layout makes it possible to remove the parts of the pouring fluid circuits protruding into the front port from said port, together with the door.

In a further development of the invention, the batter pouring installation is mounted on a front port door forming part of the enclosure of the front port, with the inside parts of the batter pouring fluid circuits which together form the pourer protruding from the side of the door facing the inside of the front port and the control elements of the batter pouring fluid circuits and the batter pumps being mounted on the outside of the door. This configuration makes possible simple monitoring and control of the batter pouring fluid circuits with the front port closed. In this regard, the parts of the batter pouring installation located outside the front port, i.e., on the outside of the door, are protected against the heat radiating from the revolving baking tongs in the front port by the front port door itself.

Another characteristic of the invention provides that the front port door carrying the batter pouring installation is supported by means of two arms pivotably mounted on the inside of the door and preferably joined together in a C-shaped strap, on two swivel arms rotatably mounted on the oven frame. This yields the advantage that the front port door, supported according to the invention, pivots around a vertical axis and may also be displaced parallel to the oven frame.

According to another characteristic of the invention, a guide ledge protrudes from the front port door. The guide ledge is provided on the inside of the door (which door, of course, carries the pourer) above the pourer. The guide ledge cooperates with guide rails provided on the front port, the latter preferably being mounted on the oven frame. By virtue of this configuration, particularly in combination with the pivoting support of the door, the door may be pulled away from the oven transversely to the running direction of the baking tongs, depending on the shape of the guide ledge and the guide rails, or it may be moved along an arbitrary curve provided on the guide ledge or the guide rails, away from the enclosure of the front port. The possibility that one can pivot or pull the doors into any position desired in any direction is especially convenient when the space available inside the front port for the extraction of the pourer is very limited.

The invention finally provides that the main drive motor for the revolving baking tongs is equipped with an axle stub, upon which an auxiliary drive is arranged, with a claw clutch being mounted on the axle stub of the main drive motor, to which an air motor is joined through a free-running coupling and a worm gear. By these means, the revolving baking tongs may be moved, for example, in case of a failure of the main drive motor, by the air motor which is powered by compressed air. Specifically, following the deactivation of the batter pouring installation, the baking tongs may be moved through the baking chamber to the wafer discharge station, so that the wafer oven may be emptied. Thus, in case of a power failure and the resulting loss of the main drive motor, the wafer molds present in the wafer oven may be brought to the wafer discharge station and the batter contained in them removed.

To summarize certain of the foregoing and to develop certain aspects of the foregoing description further, the invention relates to a wafer baking oven for making baked wafers from batter. The oven includes a baking chamber having the general shape of an elongated parallelepiped. The baking chamber has a front end and rear end and has a plurality of heating elements therein. There is an enclosure which is at least partially equipped with thermal insulation. At least part of this insulated enclosure encloses at least part of the baking chamber. A front port adjoins the baking chamber at the front end of the baking chamber. There are a plurality of baking tongs in the baking chamber, the baking tongs being movable through the baking chamber and into and out of the front port in a running direction. The baking tongs are openable when in the front port for removal of baked wafers therefrom and for charging the baking tongs with batter. The baking tongs are also closable into a closed state after being charged with batter in the front port and are movable through the baking chamber in the closed state. The front port includes a charging station for charging the baking tongs with batter and a discharge station for discharging the baked wafers along a path. The baking chamber has two lateral sides, a bottom side and a top side. These sides extend generally between the front and rear ends of the baking chamber. The baking chamber also has a rear side at its rear end. The insulated enclosure includes a pair of lateral walls defining the lateral sides of the baking chamber, a sealing wall defining the top side of the baking chamber, a bottom wall defining the bottom side of the baking chamber, and a rear wall defining the rear side of the baking chamber. The baking chamber has a baking chamber exhaust for exhausting gases from the baking chamber. The insulated enclosure substantially completely encloses at least the baking chamber on its two lateral sides, on its ceiling wall and at its rear wall, with the exception of the baking chamber exhaust. The baking chamber is also substantially completely enclosed at its bottom side. This may be accomplished either by the bottom wall or otherwise. If this is accomplished with the bottom wall, the bottom wall is preferably insulated.

The insulated enclosure has a front port portion extending into the region of the front port, the front port portion including an outlet. The insulated enclosure also substantially completely encloses the front port with the exception of the outlet. The outlet may include a wafer outlet opening through which baked wafers are discharged from the front port. It may also include a front port exhaust for gases.

It was mentioned previously that the doors or panels forming the insulated enclosure are sealed. The panel seals which accomplish this include both a receiving portion and a ledge which protrudes into the receiving portion. The receiving portion may take the form of a C beam or a groove.

The aforementioned discharge spider is carried by a shaft having an axis, and the aforementioned rotatable guides rotate about the axis of this shaft. The guides, in one embodiment, may include radial recesses for cooperation with closing rollers of the baking tongs. Each radial recess has a boundary, the boundary having a portion located forwardly of the remainder of the boundary when considered with respect to the direction of rotation of the guide. This forwardly located boundary portion has a sliding surface arranged at an incline with respect to the axis about which the guide rotates. The closing rollers are rollers on the baking tongs for effecting closing thereof. Each baking tong has a baking side at which closing and opening of the baking tong is most pronounced.

The upper and lower baking chambers of the wafer baking oven each have a front area and a rear area. Of course, the front area is closer to the front end of the baking chamber than the rear area, and the rear area is closer to the rear end of the baking chamber than the front area.

In certain embodiments of the invention, the relative dispositions of the heating elements, baking chamber, exhaust and partition are such that hot gases in both of the baking chamber sections will move in a direction counter to the running direction of the baking tongs from the heating elements to the baking chamber exhaust or exhausts.

The heat exchanger of the heat recovery installation has a frontal side facing in one longitudinal direction of the baking chamber and a rearward side facing in the other longitudinal direction. The heat exchanger is closed off by a removable top or cover which has top and bottom sides. The gas return channel is arranged in the bottom side of the removable cover. This gas return channel has a lower boundary wall formed by the bottom side of the removable cover.

The heat exchanger includes an inside wall separating the heat exchanger element or elements from the baking chamber exhaust. This inside wall helps define the bypass and it contains the closable gas flow opening.

Generally speaking, the bypass exhaust opening will be controlled by a butterfly valve located therein. Alternatively, however, the butterfly valve for accomplishing this function may be located in the gas return channel to control flow between the bypass chamber and gas return channel (see alternate showing in phantom lines in FIGS. 31a).

As mentioned earlier, the invention may include a special display device. Broadly speaking, the display device may be considered to be coupled with the baking chamber in the front port for monitoring the operation of the baking tongs, the display device having representations of the baking tongs and their tracks. There is also, as indicated, a sensor for sensing an undischarged wafer remaining in the baking tong, the sensor being coupled with the display device.

The display device includes means for presenting the symbol of a particular baking tong when a baked wafer adheres to the mold and remains in that particular baking tong after the wafer should have been discharged. The representations on the display device are light emitting elements, and the presenting means is coupled with the light emitting elements. Each light emitting element is correlated with one baking tong, whereby a light emitting element correlated with a particular baking tong is energized when a baked wafer remains in that particular baking tong.

There may be means, cooperating with the baking tongs, for emitting a signal in the case of a wafer remaining in a particular baking tong at the wafer discharge station, this signal being correlated with that particular baking tong. This emitting means includes the sensor. There is also means for storing the emitted signal and for extinguishing the stored signal upon a return movement of the particular baking tong to the wafer discharge station if the sensor does not, upon such return, emit a new signal correlated with the particular baking tong, the storing and emitting means being coupled with the sensor.

There may be means, coupled with the sensor, for deactivating the batter pouring installation when a wafer remains in a particular baking tong at the wafer discharge station in the front port and when the sensor issues a signal during at least one passage of the particular baking tong past the sensor.

The display device has first and second display device parts, the first display device part indicating the baking tong in which a wafer has remained in the tongs at the wafer discharge station. The second display device part indicates a certain baking tong that is located at a particular instant in an area between the wafer discharge station and the charging station. Alternatively, or in addition, the second display device part may indicate a certain baking tong that is located at a particular instant in the adjusting station for the baking tongs.

An input device may be coupled with the second part of the display, by which input device an input signal correlated with a certain baking tong in which a wafer remains is produced. The display device includes means for associating this input with the control of the drive for the revolving baking tongs, whereby, following the actuation of the input device, the revolving baking tongs are arrested when the certain baking tong (i.e., the baking tong including an adhering wafer or the one which needs adjustment) is located as indicated by the second display device.

The openable baking tongs have hinged parts which may be opened and which form an open space when the baking tongs are open. The batter pouring fluid circuits have inside protruding parts which are movable into this space between the hingedly open parts of an open baking tong and which are removable from this space.

Further embodiments, characteristics and advantages of the present invention will become more apparent from the examples of embodiment hereinafter represented in the drawings.

BRIEF DESCRIPTION OF THE DRAWINGS

FIG 1a shows a wafer baking oven according to the invention in side elevation;

FIG. 1b shows the same oven in a top view;

FIG. 3a shows, in side elevation, a form of embodiment of a front port of a wafer oven according to the invention;

FIG. 3b is an end view of the front port shown in FIG. 3a;

FIG. 3c is a side elevation of the same front port from the side opposite to that shown in FIG. 3a;

FIGS. 4a, 4b and 4c show a further form of embodiment of a front port in views corresponding to those of FIGS. 3a, 3b and 3c;

FIGS. 6 and 7 each show, in side elevation, a different embodiment of a wafer sheet discharge station;

FIGS. 12a, 12b and 12c show, in cross section, three different configurations of a passage opening for baking tongs;

FIG. 13b is a top view of FIG. 13a;

FIGS. 14a, 14b, 15a, 15b, 16a, 16b, 17a and 17b show different embodiments of the wafer oven according to the invention, particularly the layouts of their baking chambers in depictions similar to those of FIGS. 1a and 1b;

FIG. 18 is a cross section on the line B—B of FIG. 2a;

FIG. 19 includes details I' and II' of FIG. 18 in an enlarged scale;

FIG. 20 is a view similar to FIG. 18 of a further embodiment of the wafer baking oven according to the present invention;

FIG. 21 is a cross section on the line C—C and a cross section on the line D—D of FIG. 2b;

FIG. 22 shows a section on the line E—E of FIG. 2a;

FIG. 23 shows a section on the line F—F of FIG. 2a;

FIG. 24a shows a door of the enclosure of the front port in a view from the inside;

FIG. 24b shows a top view of FIG. 20a;

FIG. 25b is a fragmentary side elevation of FIG. 25a;

FIG. 28 is a fragmentary detailed view in section showing a part of the enclosure with bolting;

FIG. 29a is an elevational view of one form of embodiment of a heat exchanger according to the invention;

FIG. 29b is a top view of the heat exchanger of FIG. 29a;

FIG. 29c is a cross section of the heat exchanger of FIG. 29a;

FIGS. 30a, 30b, 30c, 31a, 31b, 31c, 32a, 32b and 32c show further forms of embodiment of a heat exchanger according to the invention in representations corresponding to FIGS. 29a, 29b and 29c.

DETAILED DESCRIPTION

Figure 2A:
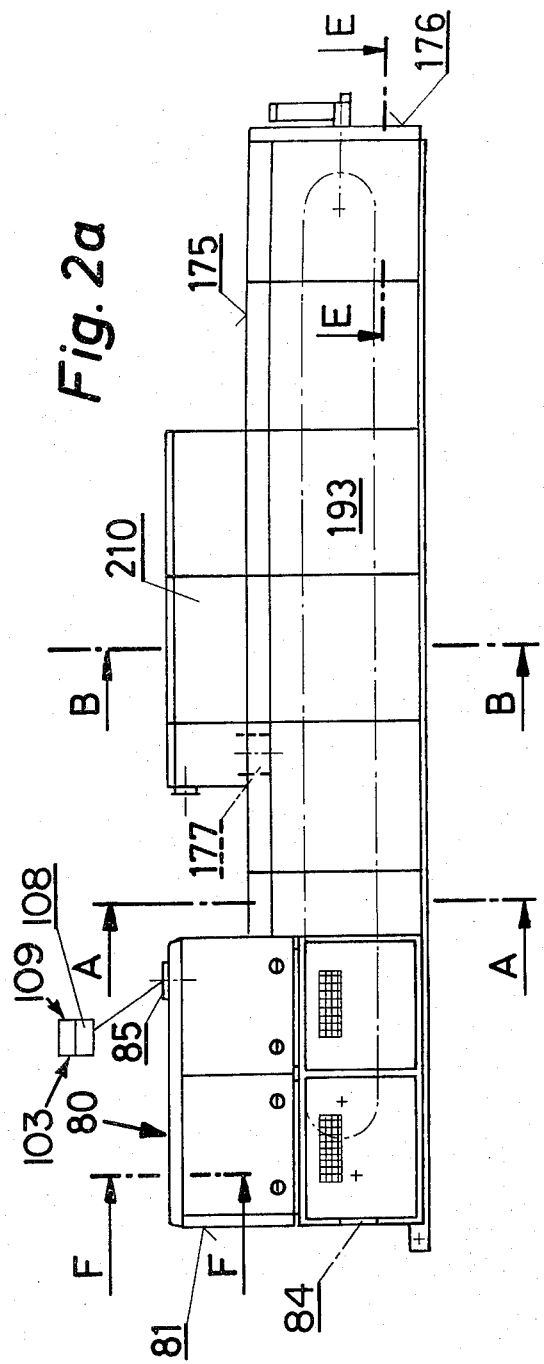
FIGS. 2a and 2b show a further form of embodiment of the invention in views similar to those of FIGS. 1a and 1b.
Figure 2B:
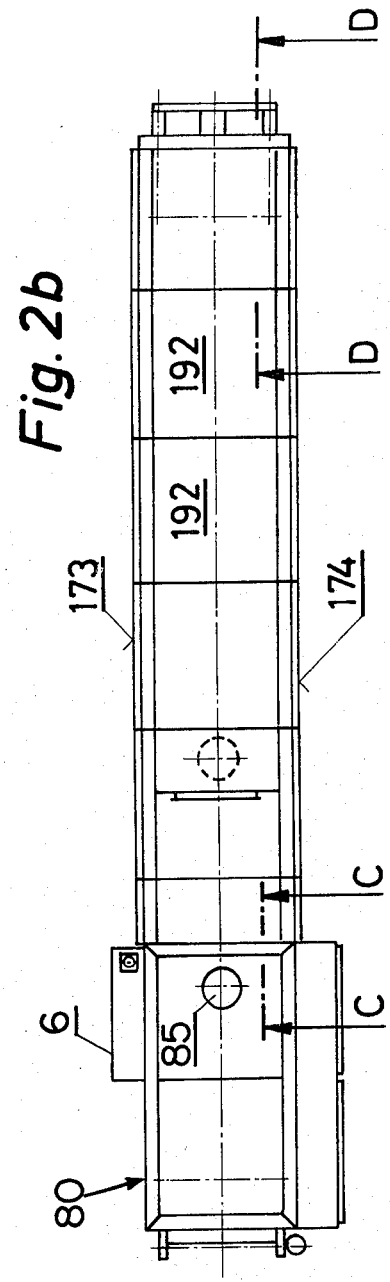

The present invention shall be described hereinafter with regard to a wafer baking oven with revolving baking tongs, wherein the baking tongs are aligned in an endless chain of baking tongs. The baking tongs carry wafer baking molds for the production of flat wafers or low hollow wafers and are baking plates, the sides of which treat the dough. The baking plates are essentially flat with the exception of patterns for wafer sheets or the recesses for low hollow wafers. Obviously, the forms of embodiment, characteristics and advantages described hereinafter may be applied to other wafer ovens within the scope of the present invention. Thus, for example, the individual baking tongs are not necessarily combined in a chain of baking tongs revolving in a vertical plane. Rather, they may be conducted through the baking oven in another manner. Further, the wafer molds arranged in the baking tongs may be designed as multiple part baking inserts for the production of wafer cones or wafer cups. Additionally, the wafer molds in the form of baking plates or sheets may be provided with steam sealing ledges or baking ledges. Furthermore, the number of baking tongs revolving in the wafer oven may be arbitrarily large. Thus, for example, both wafer ovens with only 12 baking tongs and ovens with 80 or more tongs may be utilized in accordance with the forms of embodiment and characteristics described hereinbelow.

A wafer oven 1 has at its front end 1a a front port 2, comprising a charging station 2a and discharging station 2b, and a baking chamber 3 equipped with an enclosure. Inside the wafer oven 1, the baking tongs 4, aligned in an endless chain, revolve with the wafer baking molds arranged in them. The baking tongs 4, and the wafer molds in them, are opened after their passage through the front port 2 for the removal of the wafers and the subsequent insertion of the batter. They are then closed after being charged with batter and are conducted through the baking chamber 3 in the closed state. At the discharge station, the individual wafers are taken by a discharge device 5 from the baking tongs (which have opened) and are discharged from the wafer baking oven. The charging of the batter is effected subsequent to the removal of the wafers, with the baking tongs open, by means of a batter pouring installation 6, at least part of which protrudes into the open wafer molds of the baking tongs.

According to a first form of embodiment of the invention (with variations according to FIGS. 1a, 1b, 2a, 2b, 3a, 3b and 3c), the enclosure 171 of the baking chamber 170 is equipped with thermal insulation 172 and encloses the baking chamber on both lateral walls 173, 174 at its ceiling wall 175 and at its rear frontal wall 176 (the walls corresponding with sides of the baking chamber). The enclosing of the baking chamber is substantially complete with the exception of one or several exhaust openings 177. At the bottom side of the baking chamber 170, a bottom wall 178 (corresponding with the bottom side) is provided which encloses the baking chamber at the bottom wall 178 and may also be equipped with thermal insulation 179.

Alternatively, the baking chamber 170 may be closed in the downward direction by a foundation provided in the building, possibly equipped with heat insulation, upon which the enclosure of the baking chamber is placed, or over which the enclosure of the baking chamber extends. The front port 80 attached to the baking chamber at its front end is also enclosed in this form of embodiment essentially in a complete manner by an enclosure 81, which may be regarded as a front port portion of the overall enclosure 171. Portion 81 may also be provided with heat insulation. This essentially completely enclosed and possibly thermally insulated wafer oven has only an outlet opening 84 for the wafers in its forward frontal wall 83 and one or several exhaust openings 85 for the baking gases. If a device for the removal of baking waste is added. This removal device may be arranged along the floor of the wafer oven, extending over the entire length of the wafer oven. It transports the baking wastes from the baking chamber forward to the front port, so that they may be removed, together with the waste generated in the front port. The waste is then discharged from the wafer oven through the discharge opening. In place of a single removal device, two removal devices may be provided, one of which removes only the waste accumulating in the front port, the other removing the waste generated in the baking chamber. The discharge opening for these removal devices may be placed on the forward frontal side 83 of the front port. Alternatively, the removal device for the front port may have its discharge opening for the baking wastes on the frontal side 83 of the front port and the removal device of the baking chamber may have its outlet opening in the rear frontal wall 176 of the wafer oven.

The wafer oven according to the invention may possess a housing that is sealed in a gas tight manner, thermally insulated and equipped only with the abovementioned openings, through which openings the supply lines for batter, for power or gas, possibly for secondary air for the burners, and possibly for compressed air for the removal of wafers and for cleaning of the baking molds, may be introduced in a gas tight manner.

According to a further form of embodiment of the invention, the front port 87 is essentially completely enclosed with the exception of a preferably self-closing outlet opening 84 for the wafers and an exhaust having an exhaust opening 85, with the exhaust opening arranged in the ceiling 90 of the front port enclosure or in the upper area of the rear wall 91 of the front port 87 (FIGS. 3a, 3b and 3c).

In another form of embodiment of the invention, observation or maintenance openings are provided in individual parts of the enclosure of the upper part of the front port. This makes possible the observation of the processes taking place in the front port of the wafer oven (FIGS. 4a, 4b and 4c).

Figure 5C:
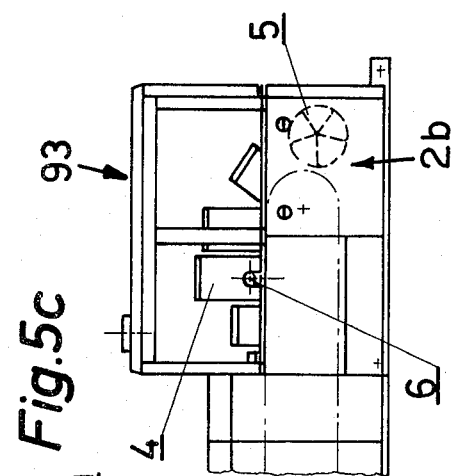
FIGS. 5a, 5b and 5c show yet another form of embodiment of a front port in views corresponding to those of FIGS. 3a, 3b and 3c.
Figure 5B:
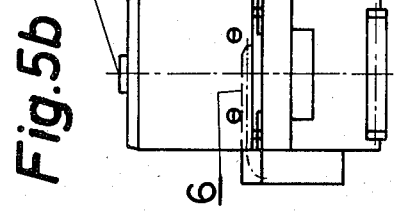
Figure 5A:
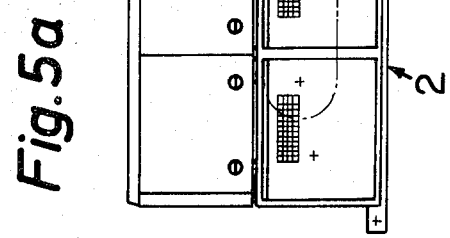

According to a further form of embodiment, the upper part of the enclosure of the front port 93 is open on one side, preferably the side at which the batter pouring installation 6 is mounted (FIGS. 5a, 5b and 5c).

The size of the openings through which air may be suctioned into the front port, 80, 87, 93, or into the entire wafer oven, is limited to a certain range depending on the form of embodiment of the front port 80, 87, 93 of the overall wafer oven. Thus, for example, the sum of the cross sectional areas of all air inlet openings, i.e., the outlet and discharge openings 84 and 86 and of the unsealed gaps between the parts of the enclosure, is equal in the case of a wafer oven equipped with wafer baking sheets, at least to 0.01 times to 0.3 times the wafer sheet format, with the range of 0.1 times to 0.3 times the wafer sheet format being preferred. (See the definition of wafer sheet "format" which follows.)

The upper limit of the sum of the cross sectional areas of all air inlet openings is considered to be 0.03 times to 1 times, preferably 0.3 times, the product of the wafer sheet format and the maximum number of baking tongs in the front port 80, 87, 93. With respect to the entire wafer oven, this sum of cross sections is between 0.01 times and 0.4 times the product of the wafer sheet format and the number of baking tongs of the wafer oven. Wafer sheet format is defined as the area of the vertical projection of a flat wafer or a low hollow wafer onto a flat substrate upon which it rests. In other words, it is the area of the largest silhouette of the wafer.

In each of the forms of embodiment of the front port 80, 87, 93, an exhaustor (schematically shown by reference characters 103 and 103a) may be connected with the exhaust to remove the steam generated in the front port 80, 87, 93 during the pouring and the closing of the wafer molds. The volume exhausted per hour by the exhaustor corresponds to 50 to 400 times the volume of the front port. The volume actually exhausted per hour is determined by the volume of steam generated and by whether only the escape of steam from the front port 80, 87, 93 is to be prevented or whether it should be possible for the operating personnel to work within the front port 80, 87, 93. In order to effect both, the exhaustor 103 may be provided with two stages.

Several variants are provided for by the invention for the layout of the front port exhaust and the exhaustor.

Thus, for example, if the entire volume of steam generated during the operation of the wafer oven is to be exhausted through the baking chamber, the exhaustor 103a will have a single stage and will be designed for an hourly exhaust volume. This reduces the temperature in the front port 80, 87, 93 to a degree—in spite of the heat radiated by the baking tongs and the wafer molds—permitting the operating personnel to work in the front port 80, 87, 93.

In this case, the exhaustor 103a is actuated prior to access to the front port 80, 87, 93 by the operator involved. With the front port 87 closed, the actuation of the echaustor is effected simultaneously with the opening of a door or the removal of a part of the enclosure. The exhaustor conveniently attains its full capacity prior to the complete opening or removal.

If the volume of steam generated in the front port 80, 87, 93 is exhausted in the front port itself, a two-stage exhaustor 103 is connected to the front exhaust 85. The first or lower stage 108 exhausts at least the steam generated in the front port 80, 87, 93, and the second or higher stage 109 exhausts a volume of air reducing the temperature in the open front port 80, 87, 93 to a level acceptable to the operating personnel.

In case of a closed front port 87, the higher stage 109 of the exhaustor 103 is actuated, for example, by the opening of a door of the enclosure 81 in the area of the front port 80, 87. Obviously, this may be effected by the operator himself, for example, from the control panel of the wafer oven. The lower stage 108 of the exhaustor 103 moves 50 to 100 times the volume of the front port and the higher stage 200 to 400 times the volume of the front port per hour.

A heat recovery installation 210 may further be connected with the exhaust of the front port 80, 87, 93. This installation may be utilized, for example, to preheat the compressed air employed in the front port, leading to a reduction in the capacities required for both the compressor and heaters. The heat recovery installation 210 may also be used to produce hot water for machines to process creams or chocolate which follow the automatic wafer baking machine in sequence on a production line. In this regard, it is especially advantageous to condense the steam exhausted from the front port as completely as possible.

In each of the abovedescribed forms of embodiment of the wafer oven according to the invention, at least one multi-arm discharge spider 5, 110, which is preferably driven synchronously with the revolving baking tongs and which rotates in a vertical plane, is arranged within the enclosure 81 of the front port 80, 87, 93.

The latter may be laid out so that a wafer sheet sliding between the arms of the discharge spider is turned around during the motion of the spider and thus transferred to a conveyor belt 111 leading out of the wafer oven (FIGS. 6 and 7).

According to one variant of the invention, the discharge spider 110 may be a sliding spider, wherein the wafer sheet slides along the arms 112 during the rotation of the spider with the same side of the wafer sheet always remaining on top. The discharge or sliding spider 110 may have four or five or more arms 112.

In order to safely guide the flat wafers or low hollow wafers in the sliding spider 110 a rotating guide 113, 113' is, according to a further aspect of the invention, provided on either lateral side of the discharge spider, thus limiting the path of the wafers. The guides 113, 113' are arranged coaxially with respect to the discharge spider 110 and may be mounted on the shaft 114 of the discharge spider, whereby they rotate synchronously with the discharge spider 110. Alternatively, the guides 113, 113' may be supported in the front port 80, 87, 93 separately on the shaft of the discharge spider 110, whereby they may rotate slightly slower or more rapidly than the discharge spider 110. In order to facilitate the resetting of the wafer oven from one size of wafer to another, the mutual distance between the two guides 113, 113' is adjustable. The adjustment may be effected by the sliding and reclamping of the guides 113, 113' on the shaft 114 of the discharge spider 110, or by axial shifting of the guides 113, 113' in their bearings on the shaft of the discharge spider. To assure the safe operation of the guides 113, 113', the mutual axial distance between the guides 113, 113' must correspond at least to 0.005 to 1.02 times the width of a wafer sheet format measured transversely to the running direction of the baking tong and must not exceed 1.005 to 1.3 times the diagonal length of a wafer sheet format.

In order to arrange the discharge spider 110 together with the guides 113, 113' as close as possible to the chain of baking tongs, at least the guide 113 arranged on the closing side of the baking tong is provided with radial recesses 115 for parts of the upper part of the baking tongs, in particular for the closing rollers 104 of the baking tongs. Rollers 104 are used in effecting closing of the tongs.

Figure 10A:
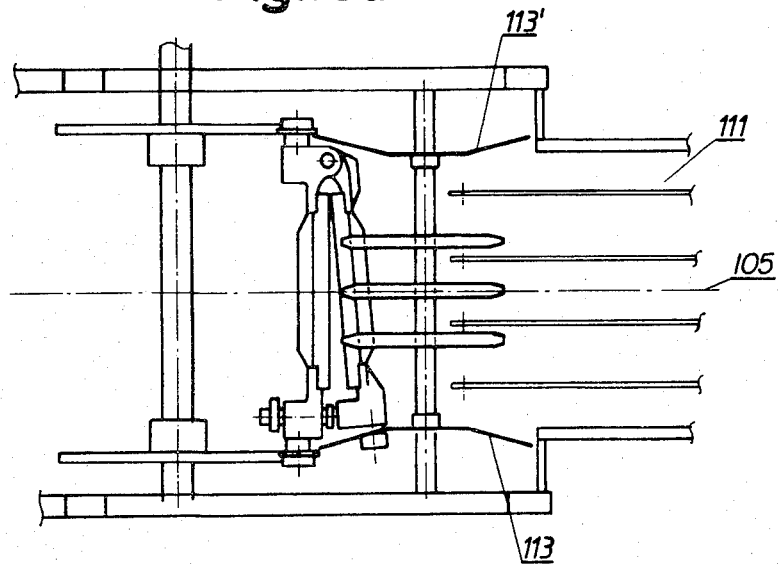
Figure 10B:
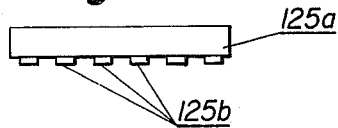
FIG. 10b shows a variant form of an upper directing device for a discharge station according to the invention.

The rotating guides 113, 113' may, according to one embodiment of the invention, each have the general configuration of a dinner plate, these guides facing each other with their convex sides (FIG. 10).

According to a variant, the guides 113, 113' are in the form of disks, with diameters equal to 0.5 to 1.5 times, preferably 0.9 to 1.1 times the diameter of the track upon which the ends of the arms 112 of the discharge spider 110 rest.

In order to prevent the adhering of flat wafers in the radial recesses 115 of the guides 113, 113', the boundaries of the radial recess 115 may have, at least in part, a sliding surface 117 arranged obliquely (i.e., at an incline) from the outside to the inside of the rotating axis of the guide 113, 113'.

Figure 8:
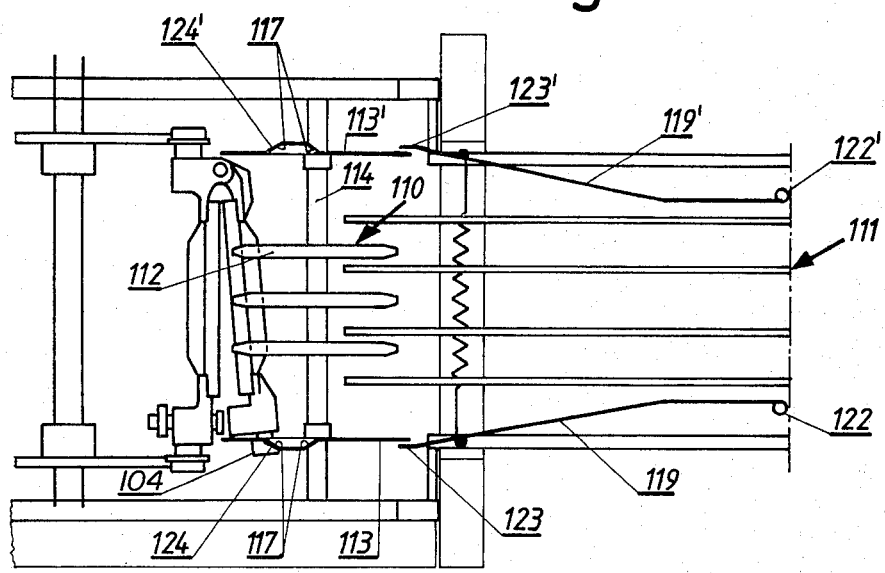
FIGS. 8, 9 and 10a show various wafer sheet discharge arrangements, each in a top view.
Figure 9:
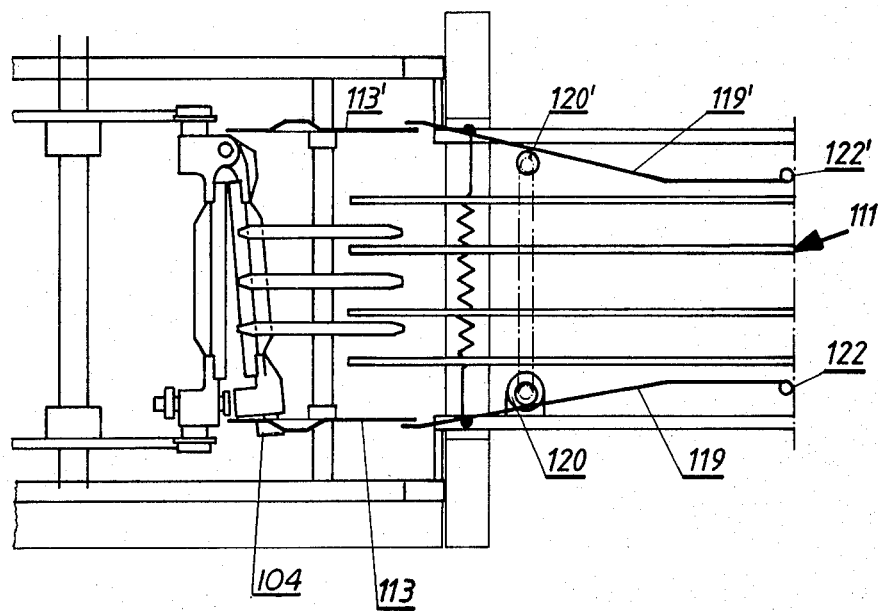

In order to prevent the sticking of flat wafers in the discharge spider 110 between the rotating guides 113, 113', or after the discharge spider 110, and to realign flat wafers exiting in an offset manner so that they become symmetrical to the longitudinal center axis of the chain of the baking tongs, two lateral directing devices or guides 119, 119' are arranged above the conveyor installation 111 which transports the wafers. Lateral directing devices 119, 119' follow the rotating guides 113, 113'. Lateral directing devices pivot around vertical axes or axles 122 and they extend in part obliquely to the longitudinal center axis 105 of the baking oven (i.e., at a lateral incline thereto). The lateral directing devices may be pivoted back and forth in a certain rhythm (FIGS. 8 and 9). The latter is effected in that the two lateral directing devices 119, 119' abut against or engage rotating eccentrics 120, 120' (FIG. 9). The axes of these eccentrics are located, viewed in the transport direction, between the discharge spider and the rotating axles 122, 122' of the two lateral directing devices, the latter being held by means of a tension spring 121 against the eccentric.

According to another form of embodiment, the lateral directing devices 119, 119' have ends 123, 123' opposite their swivelling axles 122, 122'. These ends abut against the rotating guides 113, 113' from the outside, the latter being equipped on their outwardly facing sides with projections 124, distributed over their circumference (FIG. 8). In order to guide the wafers to the outlet opening 84 even when they are ejected very late from the open baking tongs and when they are therefore sliding over the discharge spider 110, an upper directing device or guide 125, limiting the path of the wafers upward and guiding them to the outlet opening 84, is provided in the front port 80, 87, 93. Upper directing device 125 is disposed over the outlet opening 84 for the wafers (FIG. 7). This directing device is designed as a guide surface extending from the upper frontal wall 20 of the enclosure into the area over the discharge spider. The guide surface of directing device 125 may be made of sheet metal or may consist of a plurality of rods.

According to another aspect of the invention, a bulkhead-like partition 95 is provided between the front port 80, 87, 93 and the baking chamber 3, 170 of a wafer oven according to the invention. Partition 95 is equipped with two passage openings for the baking tongs with one upper passage opening 94 cooperating with the upper track of the baking tongs, i.e., the upper strand of the baking tong chain, the other lower passage opening 94 cooperating with the lower track of the baking tongs, i.e., the lower strand of the baking tong chain (FIGS. 11 to 17a and 17b, particularly 11, 12a, 12b and 12c).

Figure 13A:
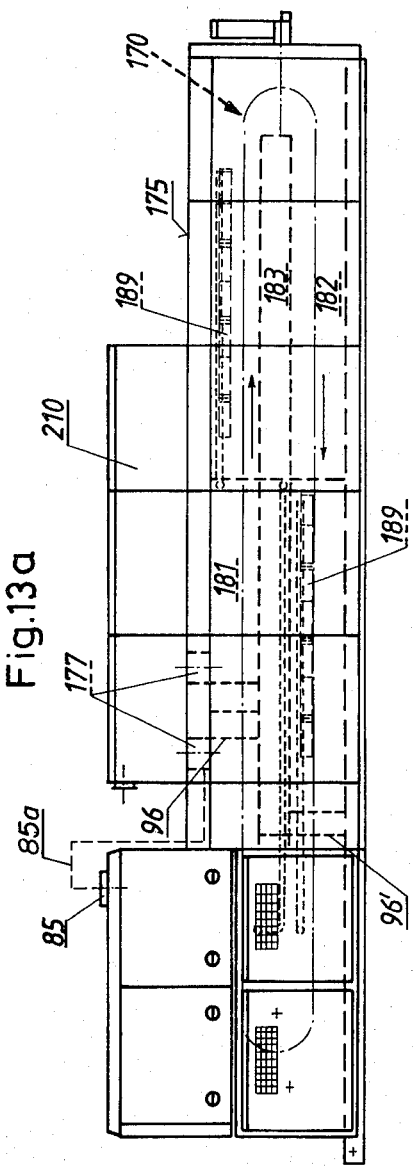
FIG. 13a shows a further form of embodiment of the wafer oven of the invention in a side elevation.
Figure 13B:
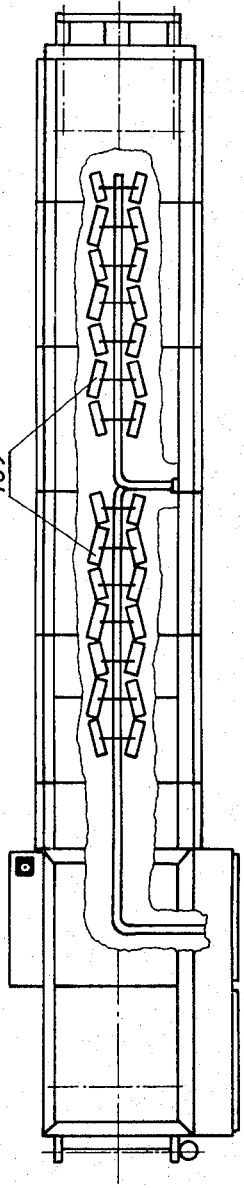
Figure 23:
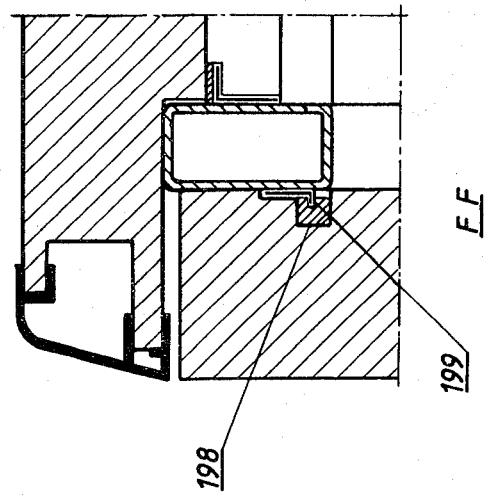
Figure 22:
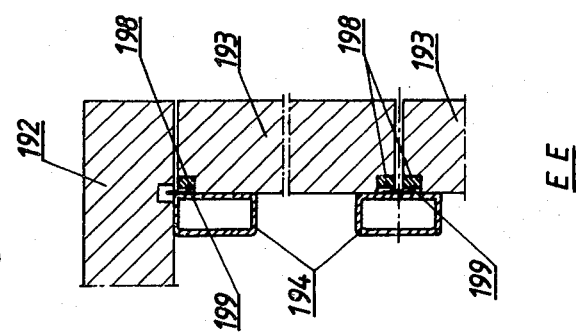

One form of embodiment of the invention provides that the two passage openings 94, 94' for the baking tongs are arranged in separate sections 96, 96' of the partition 95. The section 96 of the partition 95, which contains the upper passage opening 94, may be offset to the rear with respect to the section containing the lower passage opening 94'. This helps prevent the escape of the steam generated even immediately after the closing of the baking tongs (and thus of the wafer molds) into the baking chamber 170 (FIG. 13a).

According to the invention, the partition may consist of a single bulkhead. However, two bulkhead plates 180, 180' (FIG. 12b) or three (180, 180', 180'') may also be provided (FIG. 12a).

Figure 11:
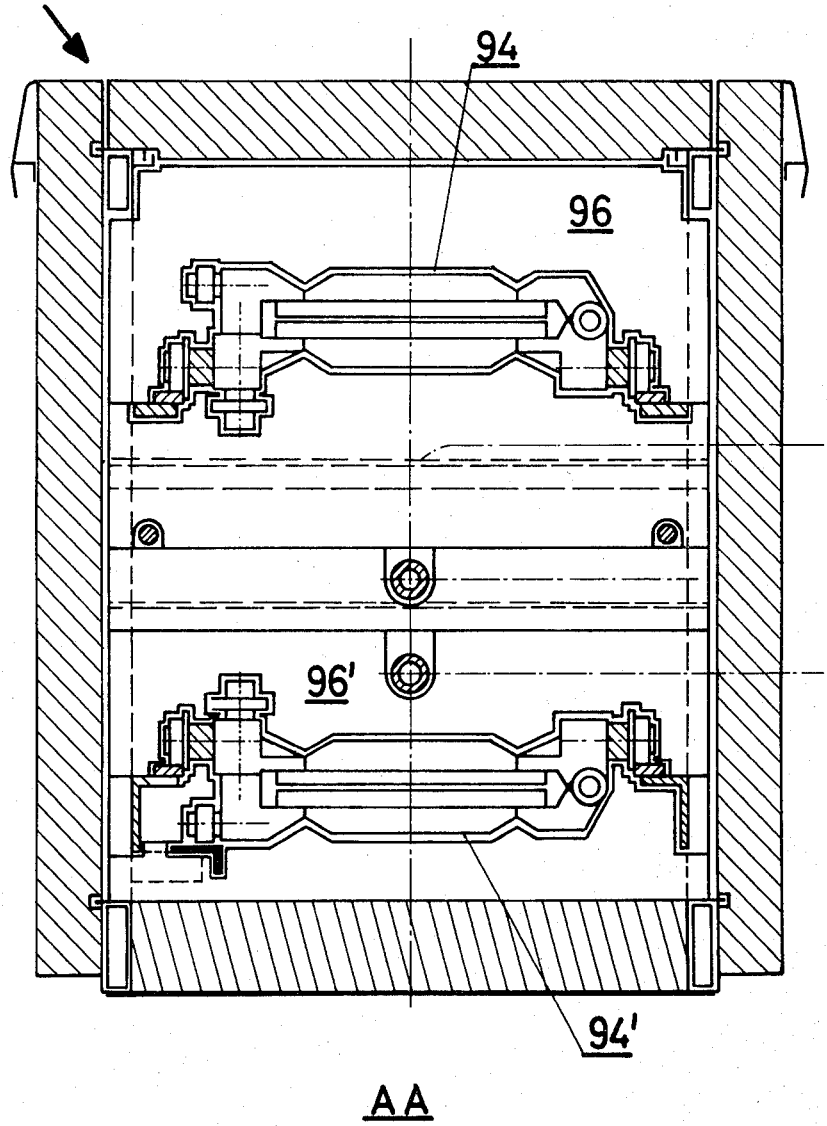
FIG. 11 is a cross section on the line A—A of FIG. 2a through a wafer baking oven according to the invention.

The passage openings for the baking tongs have an outline corresponding essentially to the cross section of a baking tong taken perpendicularly to the running direction of the latter. A cross section perpendicular to the running direction of a baking tong is defined as the cross section of all the parts moving along with the tong on its track, i.e., the wafer molds, the tong itself, and the conveyor installation for the baking tongs, for example, a conveyor chain (FIG. 11).

The cross sectional area of the passage opening for the baking tongs may be at least substantially equal in area to the tong cross section perpendicular to the running direction of the tongs. The passage opening may possibly be covered with a glass fiber curtain for the closing of the intermediate space between two successive tongs (FIG. 12a).

Appropriately, the cross section of the passage opening for the baking tongs is larger in area by 1% to 25%, preferably 5%, than the cross section of the baking tongs perpendicular to their running direction.

This ensures that, on the one hand, no exhaust gases may penetrate the front port from the baking chamber and, on the other hand, that only the volume of air necessary for the exhaust of the steam generated therein will be suctioned through the exhaustor 103, 103a. To prevent a flow of baking gases through the partition, seals (generally referred to by reference character 106) are provided in the passage openings for the baking tongs. These may consist of glass fiber curtains 107 or bristles fastened to the partition between the front port and the baking chamber, or they may consist of labyrinths formed by several bulkhead plates of the partition itself. The mutual distance between two bulkhead plates is equal at least to the distance between two successive baking tongs. According to a further variant, the seal may consist of a channel 180''' corresponding in its cross sectional shape and area to the baking tong cross section taken perpendicularly to the running direction. The length of said channel 180''' in the running direction of the tongs is at least equal to the distance between two successive tongs (FIG. 12c).

The different aspects and forms of embodiment and characteristics of the invention described hereinabove may be combined in any manner individually or in combination with those embodiments to be described hereinafter.

According to another aspect of the invention, the baking chamber 170 has two baking chamber sections 181, 182 arranged above each other and separated by a horizontal intermediate space 183. Intermediate space 183 extends only over part of the length of the baking chamber, so that the sections 181, 182 are interconnected at their rear ends. In this form of embodiment, the baking chamber exhaust 177 is arranged at the front end of the upper baking chamber section 181 (FIGS. 13a, 14a and 15a).

A further embodiment of the invention has a completely divided baking chamber 170, wherein the upper chamber section 181 is divided from the lower baking chamber section 182 by a horizontal intermediate space 183. The space 183 again extends only over part of the length of the baking chamber 170. The complete separation of the upper chamber section 181 from the lower section 182 is effected by a vertical rear partition arranged at the rear end of the intermediate space and equipped with a passage opening for the baking tongs. (Previously described partition 95 can therefore be considered a "front partition".) The baking chamber exhaust 186 for the upper baking chamber section 181 is located in front of the rear partition 185, while the baking chamber exhaust 187 is located behind the rear partition 185. Both exhausts 186, 187 extend out of the baking chamber in the upward direction (FIG. 17a).

According to another embodiment, the two baking chamber sections 181, 182 are separated at their rear ends, as described in the preceding example, but interconnected at their front ends, with the baking chamber exhaust 177 being arranged at the rear end of the upper section 181 (FIG. 16a).

In the aforedescribed different examples of embodiment of the baking chamber (FIGS. 13a-17b), heating means in the form of heating elements are provided in each of the baking chamber sections 181, 182. They extend along the length of the baking chamber. In the case where sections 181, 182 are separated at their front ends and interconnected at their rear ends, the heating elements 189 in the lower section 182 are arranged conveniently in the front part of the section, while the heating elements 189 in the upper section 181 are arranged in the rear part of the baking chamber section. By virtue of this layout, the baking gases flowing from the heating elements may be utilized in the lower section in the rear part and in the upper section in the front part for the heating of baking tongs, prior to their exit through the exhaust (FIGS. 13*a*-15*b*).

If the two baking chamber sections 181, 182 are completely separated at both their front and rear ends as described hereinabove, the heating elements 189 in both sections 181, 182 are arranged in the front part of the baking chamber sections (FIGS. 17*a* and 17*b*).

If the baking chamber sections 181, 182 are interconnected at their front ends and separated at their rear ends (FIG. 16*a*), the heating elements 189 may be arranged appropriately in the lower section in the rear part and in the upper section in the front part. In this case, the baking chamber exhaust 186 leads to the outside at the rear end of the upper chamber section 181 in front of the partition 185. According to a variant, the heating elements may be arranged in the upper section 181 in the rear area and in the lower section 182 in the front area, with the baking chamber exhaust 187 leading to the outside from the lower section 182 behind the rear partition 185. In this variant, in contrast to the preceding, the flow direction of the baking gases from the heating elements to the baking chamber exhaust is in the opposite direction. The heating elements 189 may be located in each section either above or below the track of the baking tongs, depending on their configuration, or even both above and below the track.

The heating elements may consist of gas flame burners, possibly requiring a secondary supply of air for combustion, or infrared gas radiators operated with primary air only. The gas flame burners are arranged conveniently under the track of the baking tongs, while the infrared radiators are located primarily directly above the track of the baking tongs. Energy is supplied to the gas burners according to one embodiment of the invention through the hollow profiled tubes of the oven frame 194 (FIG. 20) which takes the form of a profiled tubular frame (FIG. 20). In this embodiment, the gas-air mixture required is supplied to the gas burners through a part of the tubular frame, while the necessary secondary air is conducted through another part of the tubular frame in the immediate vicinity of the gas flame burners. If infrared gas radiators are used, only the gas-air mixture to be supplied to the burners is conducted through a part of the tubular frame.

According to a further form of embodiment of the invention, the heating elements are in the form of electric infrared burners arranged directly over the track of baking tongs and possibly also directly below the track, with the electric lines to each of the burners conducted in the intermediate space 183 located between the two baking chamber sections 181, 182, said space 183 possibly being thermally insulated against the two baking chamber sections and potentially aerated to cool the said sections. Space 183 may include a ventilating orifice 20.

According to a further example of embodiment of the invention, the enclosure of the wafer oven is comprised, both in the area of the front port and in the area of the baking chamber, of interconnecting plates 192 or doors 193 fastened to a supporting oven frame 194. The plates 192 or doors 193 may be sealed at their abutments both against each other and against the oven frame, or only against each other (FIGS. 2*a*, 2*b* and 18–23).

The enclosure 81 in the area of the front port 80, 87, 93 may have at least one front port door 97, which in the closed state is sealed against the oven frame and which carries a batter pouring installation 6 (FIGS. 1*a*, 1*b*, 24*a* and 24*b*). In order to be able to remove the batter pouring installation, for example, for cleaning, from the front port, the door 97 may be pivoted into a position approximately perpendicular to the running direction of the baking tongs. Alternatively, it may be placed, upon opening, into a position parallel to the running direction of the baking tongs. The door 97 carrying the batter pouring installation 6 is supported according to an example of embodiment of the invention, by means of arms 98, 98' swivellingly mounted with respect to a vertical axis 23 on the inside of the door 97. Arms 98, 98' join two pivoting arms 99 rotatably supported on the oven frame 194 so that the two sets of arms may pivot about a common vertical axis 24. The two arms 98, 98' are conveniently interconnected to form a C-shaped strap rotatable around vertical axle or axis 23. The strap 100 is supported by means of the arms 98, 98' in the area of the vertical center axis 25 of the door on the inside 26 of said door, pivotably, while the pivoting arms 99, also connected with each other, are mounted rotatably on the oven frame 194 in the area of one of the side edges 27 of the door around a common vertical axle or axis 28.

In order to better control the door upon opening and to protect the pourer 6 against damage, according to a further aspect, a guide ledge 101 is provided on the inside of the door 97. The guide ledge protrudes from the door and cooperates with the guide rails 102 mounted on the oven frame 194 or the ceiling 90 of the front port, so that the batter pourer may be pulled away from the front port, together with the door 97, transversely to the running direction of the baking tongs, without rotating the door while the pourer is still within the front port. The guide ledge consists of a shaped ledge protruding from the upper edge of the door 97. It is straight and engages the straight guide rail 102 in the front port (FIGS. 24*a* and 24*b*).

Figure 26A:
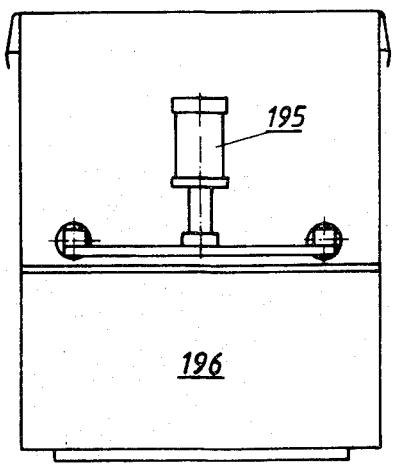
FIGS. 26a and 26b show a further form of embodiment of a rear end of a wafer oven in a representation corresponding to that of FIGS. 25a and 25b.
Figure 26B:
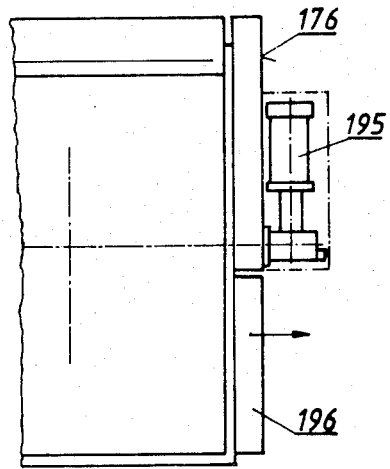
Figure 25A:
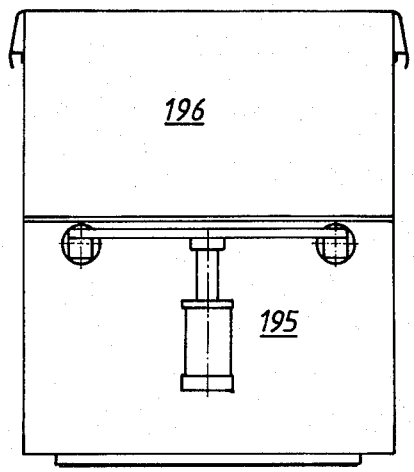
FIG. 25a is an end elevational view of the rear end of a wafer oven according to the invention with a hydraulic chain adjuster device.
Figure 25B:
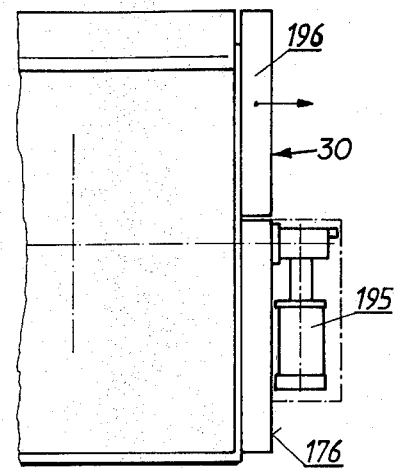

According to another form of embodiment of the invention, the enclosure 171 in the area of the baking chamber consists of plates 192 and doors 193, both thermally insulated, with the plates forming the ceiling wall 175 of the baking chamber, while at least part of the side wall 173, 174 of the enclosure 171 consists of doors 193, extending over the entire height of the side wall 173, 174. Thus, both the bottom wall 178, 179 of the baking chamber 170 and the ceiling wall 175 of the baking chamber abut bluntly against the upper and lower edges of the doors 193 (FIGS. 2*a*, 2*b* and 19–22). According to the invention, the rear frontal wall 176 of the baking chamber may consist at least in part of a door (FIGS. 25*a*, 25*b*, 26*a* and 26*b*). Thus, for example, a tensioning device 195 for the baking tong chain may be located on the lower part of the rear frontal wall 176, while the upper part constitutes a door 196, which upon opening provides good access to the baking tong chain, for the adjustment of individual tongs and the wafer molds contained therein (FIGS. 25*a* and 25*b*). That is, the door 196 provides an adjusting station 30. Obviously, the tensioning device 195 may also be located on the upper part of the frontal wall and the lower part of the wall may consist of a door (FIGS. 26*a* and 26*b*).

A further embodiment of the invention provides that, in the case of an enclosure 171 or 81 formed by panels and doors, the individual doors and plates are sealed against the oven frame 194. The upper and lower edges of the doors and the lateral edges of the plates in the direction of the length of the oven are sealed against the longitudinal beams of the oven frame 194, while the vertical door edges and the edges of the panels extending transversely to the longitudinal direction of the oven are sealed against transverse girders connecting the longitudinal beams of the oven frame (FIGS. 19–23). According to a variant of the invention, the doors and/or the panels of the enclosure may be bolted from the inside of both the baking chamber 170 and the front port 87 (FIG. 28). In order to open the enclosure of the entire wafer oven in the closed state, at least one door, preferably in the area of the front port, is equipped with bolting that may be actuated remote by a remote control operator (schematically shown at 305 in FIG. 28), for example, by electrical or pneumatic means. Beginning with this door, the enclosure may be unbolted and opened or removed panel by panel or door by door for cleaning and maintenance work. Conveniently, both the door 196 located in the front wall 176 of the baking chamber 170 and the door carrying the batter pouring installation in the area of the front port may be bolted and unbolted by remote control. Obviously, the entire front port portion of the enclosure may be locked by remote control or not locked at all, in which case only the baking chamber 170 itself and its parts are equipped with inside bolting devices.

The remote-controlled bolting device 300 on the inside may consist, according to the invention, of a shaft 301 rotatably supported on each longitudinal side of the baking chamber on the oven frame 194. The shaft 301 extends over all of the doors 193 belonging to the side wall in question. An upwardly pointing hook 302 is arranged on each door 193 to be engaged from the top in the case of doors bolted by hooks 303 mounted on the shaft 301. By means of this configuration, the side wall or its doors 193 may be unlocked by the simple rotation of the shaft 301. The rotation of the shaft 301 may be effected both electrically or pneumatically (FIG. 28).

The sealing of the panels 192 or doors 193 forming the enclosure 171 or 81 against the longitudinal and transverse girders in their edge areas of the oven frame 194 (which frame consists of profiled tubes) is effected by panel seals including a ledge 199 protruding inside a C beam 197 or a groove 198. The inside of the C beam 197 and the groove 198 is filled with a heat-resistant sealing or gasket material. The ledge 199 abuts against, engages or extends into the heat-resistant gasket material in the case of closed doors 193 or assembled panels 192 (FIG. 19). In the case of the panels constituting the ceiling wall 175, the C beam 197 is mounted on the longitudinal beams 194 of the oven frame in an upwardly open state and the ledges 199 consist of an L-shaped profile set into an edge bead of each plate. In the case where the edges of the panels 192 are arranged transversely to the length of the oven, the seal between two abutting plates is formed by a single C beam (FIG. 21). In the case of the doors constituting the side walls 173, 174 of the enclosure 171, a groove 198 is provided in the edge of the door, the groove being filled with heat-resistant gasket material. A ledge 199, protruding from the oven frame, extends into the gasket material. The handles 200 for the opening of the doors 193 are mounted on the outside of the doors 193, so that, in case of an accidental leakage of a seal, for example, due to damage, the hot baking gases escape upwardly through the blunt abutment between the ceiling wall and the door, without heating the handle 200 (FIGS. 19 and 20).

According to a further variant of the embodiments of the wafer oven according to the invention, a heat recovery installation 210 is attached to the baking chamber exhaust 177 or 186 or 187 (FIGS. 13a–17b). This heat recovery installation may be set, for example, on the ceiling wall 175 of the baking chamber 170 and may also be connected with the exhaust 85 of the front port (see phantom line 85a). The heat recovery installation 210 (FIGS. 29a–32c) comprises a heat exchanger 211 containing one or several heat exchanger elements that are placed in a tub-like lower part 212. The tub-like lower part 212 has an inlet opening 213 for the baking gases, connected with the baking chamber 170 and/or the front port 87 and with their exhausts, respectively. The tub-like lower part 212 is closed on top by a ceiling wall 216, so that a gas channel is created in the tub-like lower part. The heat exchange elements 211 are arranged in the tub-like lower part. At the end of the heat exchanger 211 opposite the gas flow opening 215, a gas outlet opening 217 is provided, connected either directly with an exhaust conduit or opening into a gas return channel 218 located above the ceiling wall. The gas return channel 218 leads to the frontal side 214 of the heat exchanger 211 and there opens to the outside. The gas return channel 218, according to a further embodiment of the invention, may be formed by the bottom side of a cover 216 which closes off the tub-like lower part on top. The lower boundary wall of the gas return channel 218 forms the ceiling wall 216a of cover 216. Both the gas flow opening 215 and the gas outlet opening 217 may be closed off by means of one or several butterfly valves 215a, 217a.

According to another embodiment of the invention, a bypass is created inside the heat recovery installation 210. The tub-like lower part 212 of the heat recovery installation 210 is equipped with a bypass chamber 219, into which the baking chamber exhaust 85 and/or the front port exhaust 117 open and which is separated from the heat exchange elements by an opening that may be controlled by a flap 220. The bypass chamber 219 opens at its top side through a bypass exhaust opening 221, equipped with a butterfly valve 222, into the exhaust gas return conduit 218. The bypass may be regulated by the adjustment of the valves 200 and 222 (FIGS. 29a–c, 31a–c and 32a–c).

According to a further form of embodiment of the invention, the heat recovery installation 210 may be connected both with the exhaust of the baking chamber 170 and of the front port with two separate heat exchange elements being provided for the exhaust gases of the baking chamber and the front port. In this way, the gases exiting from the heat exchange elements enter the gas return channel through a common exhaust orifice 32 (FIGS. 30a–c). It is appropriate to locate the two exhaust openings from the wafer oven on two opposite ends of the heat exchanger, with a bypass opening, controlled by a bypass valve, being provided above each of the exhaust openings, such bypass exhaust opening communicating with the gas return channel. In that case, the right-hand side of the heat exchanger will generally be a minor image of the left-hand side shown in the drawings. According to a further characteristic of the invention, a heat exchange element is arranged inside the bypass chamber of the tub-like lower part, wherein the compressed air required in the front port for the removal of the wafers and the cleaning of the wafer molds is preheated (FIGS. 31a–c).

According to another form of embodiment of the invention, the heat recovery installation 210 is equipped with a cleaning device for the individual heat exchange elements or registers 211.

The cleaning device is composed of individual water spray pipes 250 arranged between the heat exchange elements or registers. Pipes 250 are equipped with spray orifices 251 arranged in the pipes 250 so that the water jets exiting from them are directed inside the heat exchange elements 211. The individual water spray orifices may consist of spray nozzles, or special nozzle bodies may be inserted in the orifices. The water spray pipes 250 may be mounted fixedly between the heat exchange elements or registers 211 in the tub-shaped lower part 212 of the heat exchanger.

According to a further form of embodiment, the spray pipes 250 may be located displaceably in the interstices between two adjacent heat exchange elements or registers 211 so that they may be moved up and down between them for the cleaning of the heat exchange elements. They thus cover by means of their spray nozzles all of the contaminated parts of the heat exchange elements. The cleaning device may be controlled by means of a negative pressure measuring instrument 260 arranged in the heat exchanger. In the case of the increasing contamination of the heat exchanger and the resulting flow resistance of the heat exchanger, the negative pressure measuring instrument 260 actuates the cleaning device automatically when a certain degree of contamination is attained. Conveniently, the negative pressure measuring instrument 260 is placed in the exhaust gas return channel 218. It is capable of regulating the bypass or its closing or butterfly valves by means of a signal emitted.

Figure 34:
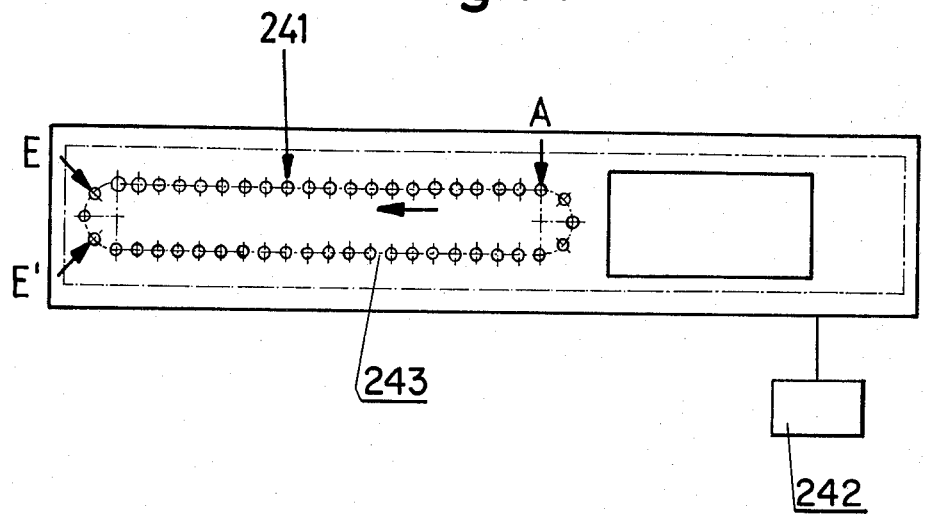
FIGS. 33 and 34 each show a display device in elevational front views.
Figure 33:
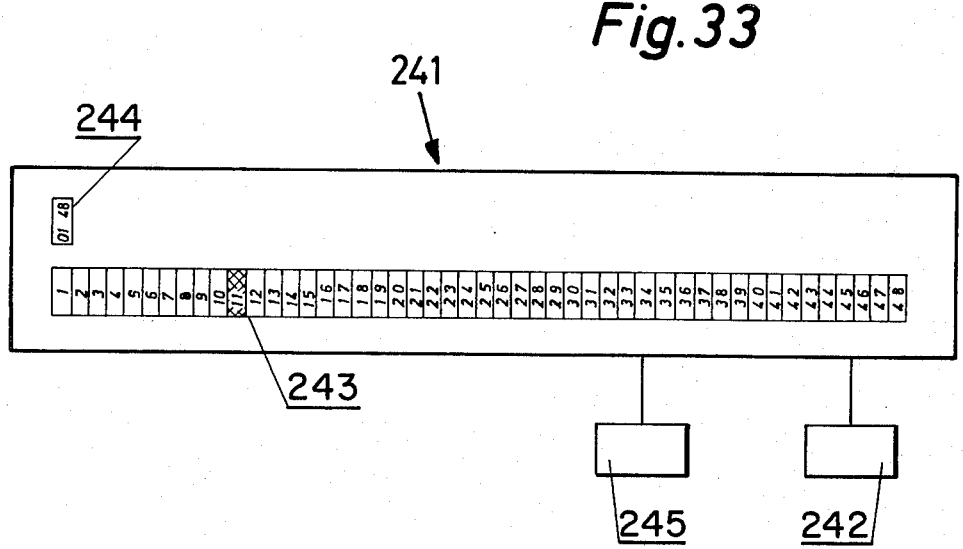
Figure 35:
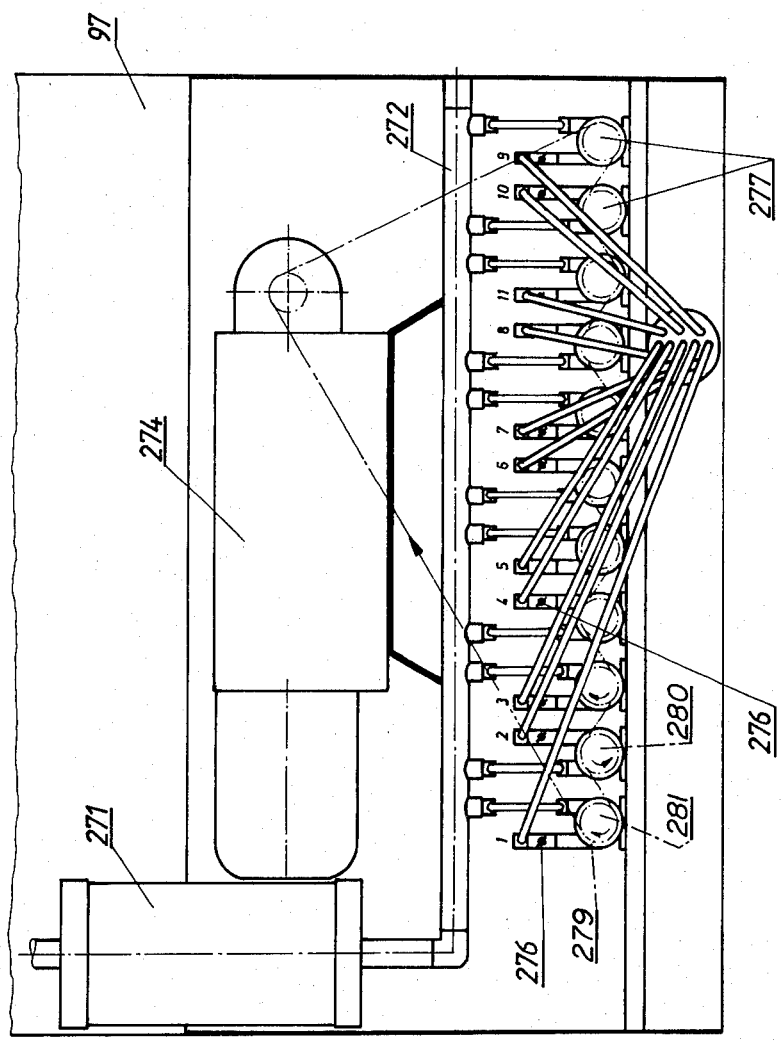
FIG. 35 is a view from the outside of a door with a batter pouring installation mounted upon it.
Figure 36:
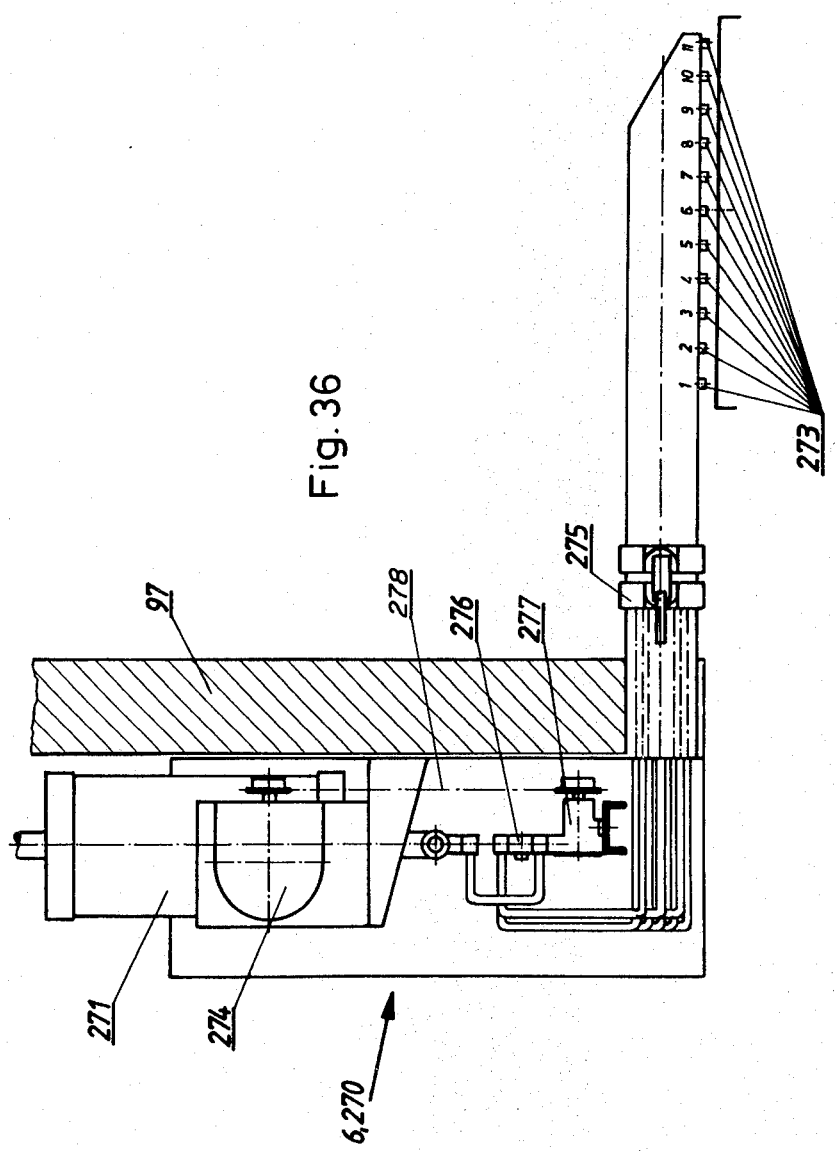
FIG. 36 is a section through the door according to FIG. 35.

According to a further aspect of the invention, the wafer baking oven has a display device upon which the individual baking tongs are represented by means of a digital display 241, with a separate number of symbol field being assigned to each baking tong (FIGS. 33 and 34). The digital display determines by means of a sensor 242 (shown in FIG. 7 and schematically shown in FIGS. 33 and 34) arranged in the area of the front port, whether the wafers baked in the baking tong are actually removed from each of the tongs moving past the wafer discharge station. Such a sensor may, for example, constitute a transducer elastically resting against the batter treating side of the wafer molds, under which the wafer molds slide during their movement. Whenever a wafer remains in the baking mold, the wafer will interrupt the mass contact of the transducer with the batter treating side of the mold, thereby creating a signal. If a wafer is not ejected from the wafer mold, i.e., if it continues to adhere to the wafer mold, the signal emitted by the sensor is transmitted to the digital display 241 and the symbol assigned to the baking tong involved lights up (FIG. 33). According to another form of embodiment, the track of the baking tongs is represented on the display device by means of individual lamps, with each lamp indicating the instantaneous position of a certain baking sheet (FIG. 34). In FIG. 34, the pouring station is designated by A and the adjusting station of the wafer oven is designated by E. In this form of embodiment, a lamp correlated with the instantaneous position of a baking tong lights up in the case of an adhering wafer. In order to achieve an unambiguous correlation of the baking tong and the wafer adhering in it, each baking tong or baking tong carriage is provided with a special number or symbol 400 which is pressed or stamped as a mirror image in the wafer mold (FIG. 6).

According to a further form of embodiment, whenever a wafer remains in a baking tong at the wafer discharge station, the signal associated with the tong is stored and extinguished if, during a complete revolution of the baking tong in which batter had been poured and wherein wafers were baked, the wafer is discharged at the wafer discharge station. If this does not take place, the signal of the sensor will deactivate the batter pouring installation during each passage of the baking tong in which a wafer remains through the pouring station A. Alternatively, the wafer oven may be stopped.

The display device 241 may, according to the invention, be provided in two parts, with one part 243 indicating in which baking tong a wafer is remaining at the wafer discharge station, the other part showing which of the tongs is at the moment located between the wafer display station and the charging station (FIG. 33). It may be indicated, furthermore, which of the tongs is at this moment in the adjusting position E or E' at the rear end of the baking chamber. An input device 245 may be provided, further according to the invention, whereby a certain number or a certain symbol may be entered, whereupon the wafer oven is arrested when the wafer or the corresponding baking tong of the number or symbol 400 is in the adjusting position E or E'.

As indicated, a batter pouring installation 6 may be provided on a door of the enclosure 81 (FIG. 1a). The batter pouring installation 6, 270 consists of a batter reservoir 271 and the batter pouring fluid circuits originating from it. The batter pouring fluid circuits are connected with a supply line, in turn connected with the batter reservoir. The pouring circuits include parts protruding into the front port, and each circuit includes only a part of the batter outlet openings 273 associated with each baking tong (FIGS. 35–40). The number of batter outlet openings 273 covered by each batter pouring circuit may be chosen conveniently depending on the form of the wafer mold in the baking tong and the consistency of the batter and other baking conditions. Thus, for example, in the case of a wafer mold equipped with a male and a female die, such as those to produce wafer cones, a special batter pouring circuit may be assigned to each recess in the female die, covering preferably only a single batter outlet opening 273. For the pouring of batter in strips into wafer molds consisting of baking sheets, two or more batter pouring circuits may be arranged adjacently to each other, whereby each batter pouring circuit covers a pouring area consisting of several pouring strips. According to the drawings (FIGS. 35–40), an example of such a batter pouring installation 270 is shown. This installation includes 11 connected pouring circuits, each equipped with its own pressure control valve 276 or pump 277, with all of the pumps 277 driven by a single drive motor 274. The batter reservoir 271, the drive motor and the batter pumps are mounted on the outside of the door and the individual batter pouring circuits have individual batter lines in the form of pipes, passing through the door into the inside of the front port in a common pipe, ending on the inside of the door in a coupling sleeve 275 and extending from there to each of the batter outlet openings 273. The batter exit openings are formed by the openings of the individual batter lines, preferably in the form of nozzles, with the openings being arranged on an axis transverse to the running direction of the baking tongs. The openings are distributed uniformly over the width of the baking tongs (FIGS. 36–40).

Figure 37:
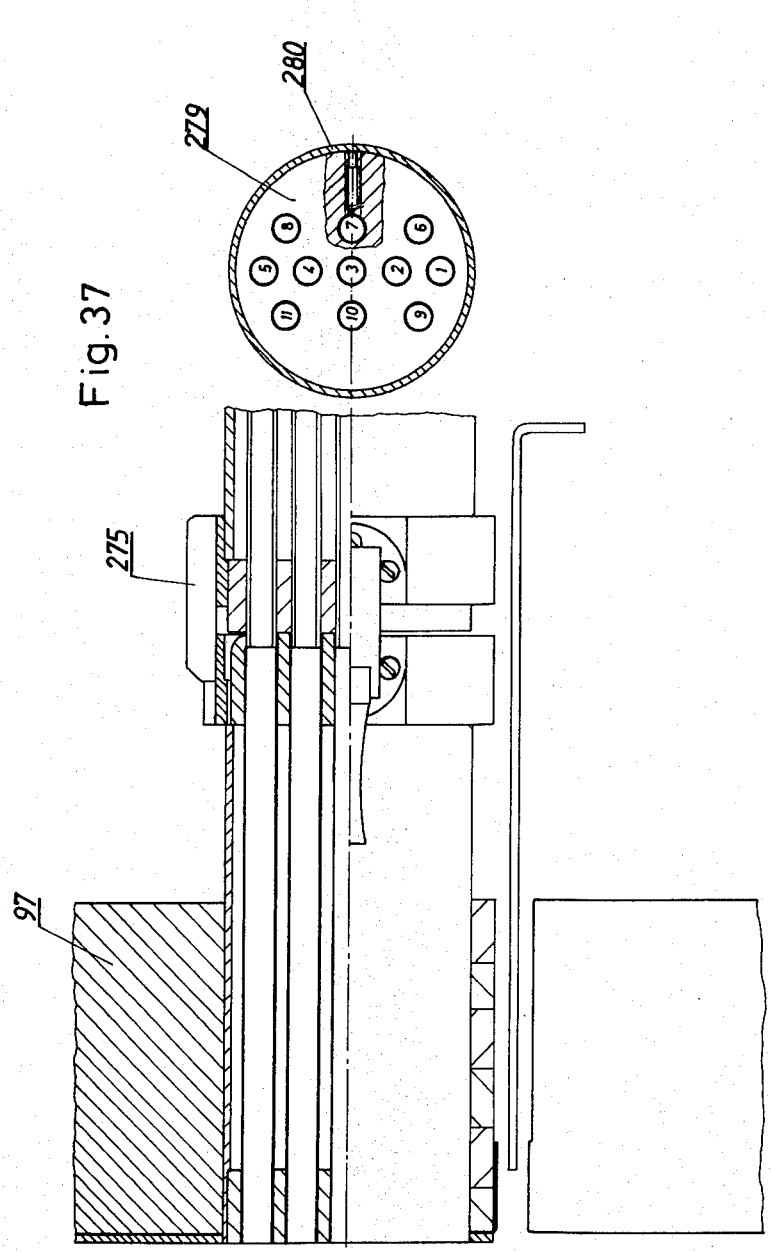
FIGS. 37 and 38 are enlarged details of FIG. 36 in two different forms of embodiment.
Figure 38:
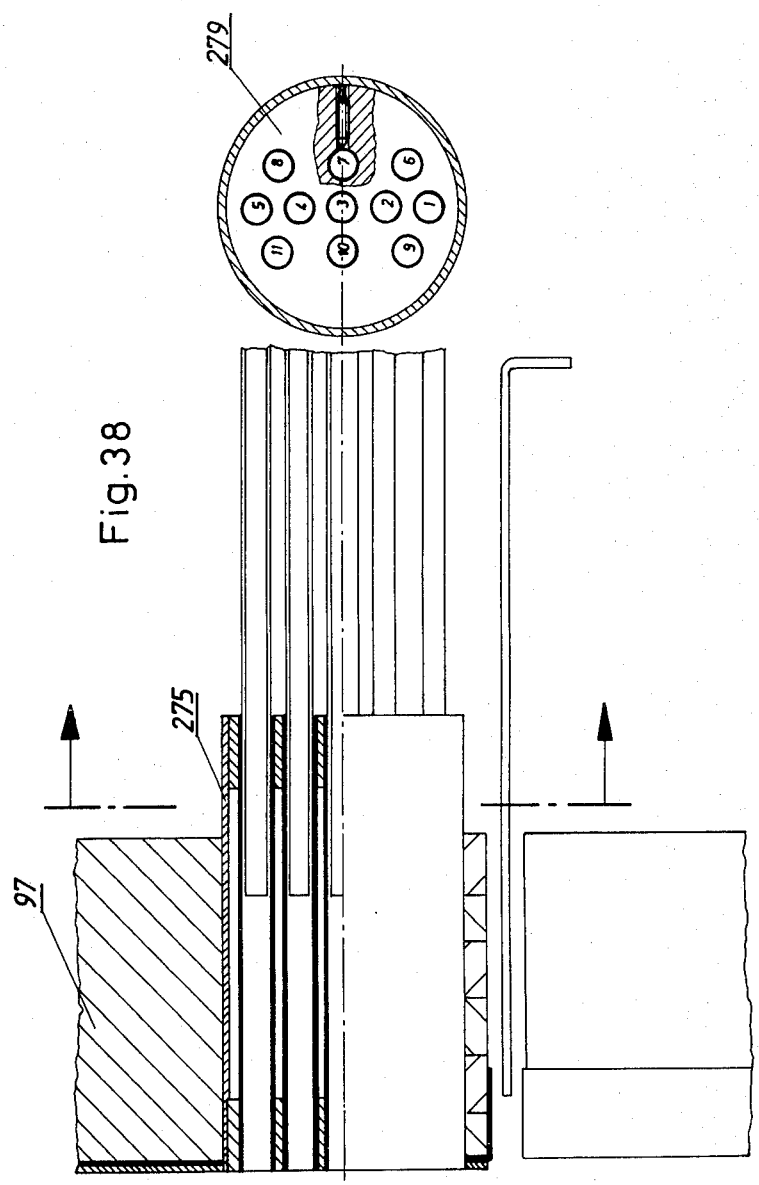
Figure 39:
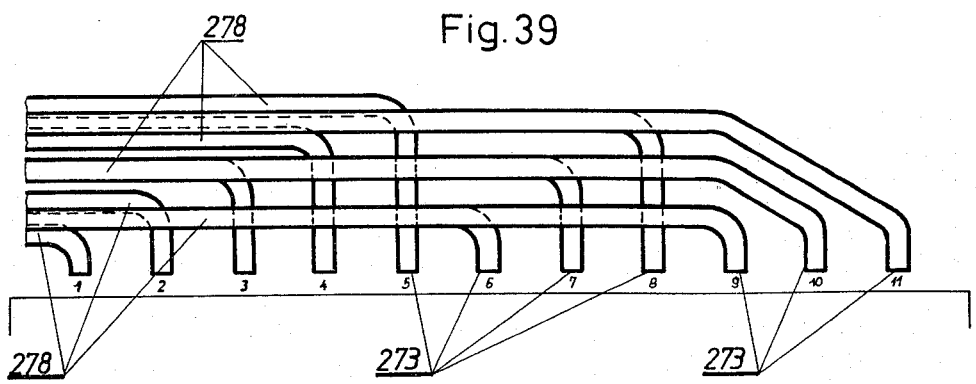
FIGS. 39 and 40 show different forms of embodiment of the part extending into the front port of a batter pouring installation according to the invention.
Figure 40:
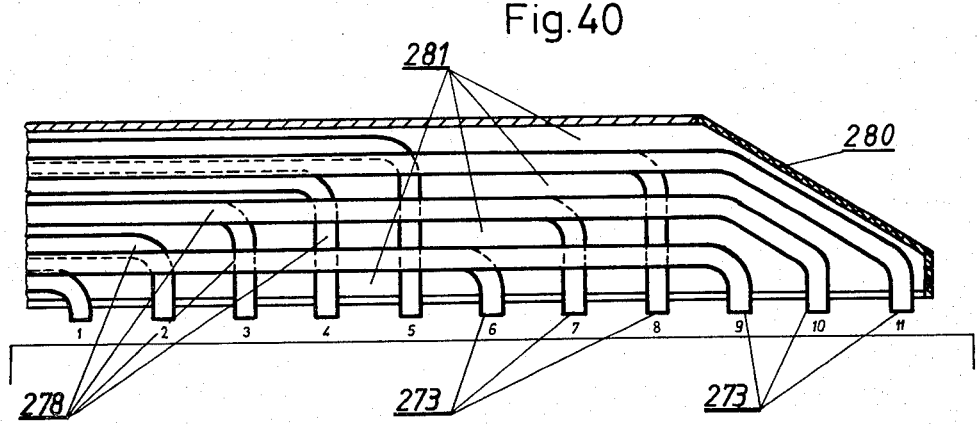

The parts of the individual batter lines or circuits extending into the front port are in the form of self-supporting pipes. The position of the exit opening is adjustable by the displacement of the batter pipe involved within the sleeve 275 (FIGS. 38 and 39). The individual pipes extending into the front port may be surrounded by a self-supporting tubular housing, with the cavity between the batter pipes and the housing being filled with thermal insulation 279 (FIGS. 37 and 40).

The adjustment of the volume of batter poured by each of the batter pouring circuits may be effected in the example described, for example, by control valves 276 in the individual batter lines leading away from the pumps. Alternatively, the pumps of the batter pouring circuits may be equipped with a single, common drive in the form of a chain drive 278, with the number of teeth 279 of the sprockets 280 mounted on the drive stubs 281 of the pump being varied to regulate the volume of batter.

Figure 27A:
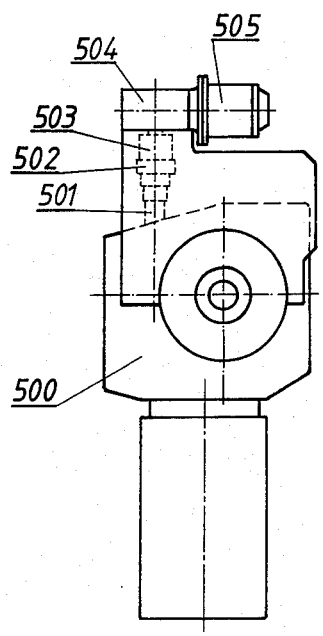
FIGS. 27a and 27b show in front (FIG. 27a) and side (FIG. 27b) elevation the main drive motor of the wafer oven with an auxiliary drive.
Figure 27B:
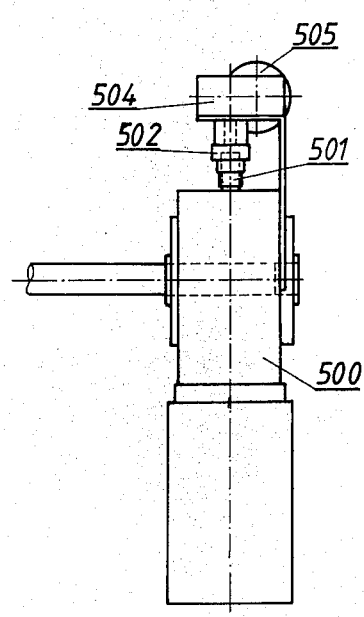

According to a further aspect of the invention, a claw clutch 502 is mounted on the axle stub 501 for the auxiliary drive of the main drive motor 500 for the baking tongs. An air motor 505 is connected to the axle stub 501 by means of a free running coupling 503 and possibly a worm or angular gear 504. In this embodiment of the invention, it is possible, in the case of a power failure and the resulting loss of the main drive motor, to empty the wafer oven by means of the compressed air still available in a reservoir, with the aid of the air motor. The air motor is coupled with the main drive through claw clutch 502 and free running coupling 503 in order to rotate the baking tong chain 34, for example, with a manual crank, if necessary (FIGS. 27a and 27b).

An alternative to the types of upper directing devices 125 described above is shown in FIG. 10a. There, the upper directing device comprises a pipe 125a for receiving compressed air. Pipe 125a has a plurality of compressed air outlets 125b directed downwardly and arranged transversely to the direction of wafer transport to guide the wafers discharged by the discharge spider 110.

It will be apparent that any combination of the aspects, features and forms of embodiment described herein of the invention, together with the combination of these forms of embodiment and all of the variants evident to persons skilled in the art, are within the scope of the present invention.

What is claimed is:

1. A wafer baking oven for making, from batter, baked wafers such as flat wafers, low hollow wafers, sugar cones, wafer cups, wafer figures and the like, the baking oven comprising:
   a baking chamber having the general shape of an elongated parallelepiped, the baking chamber having a front end and a rear end, the baking chamber having a plurality of heating elements therein;
   an enclosure which is at least partially equipped with thermal insulation, at least part of the insulated enclosure enclosing at least part of the baking chamber;
   a front port adjoining the baking chamber at the front end of the baking chamber;
   a plurality of baking tongs in the baking chamber, the baking tongs being movable through the baking chamber and into and out of the front port in a running direction, the baking tongs being openable when in the front port for the removal of baked wafers therefrom and for charging the baking tongs with batter, the baking tongs also being closeable into a closed state after being charged with batter in the front port and being movable through the baking chamber in the closed state;
   the front port including a charging station for charging the baking tongs with batter, and a discharge station for discharging baked wafers along a path;
   the baking chamber having two lateral sides, a bottom side and a top side, which sides extend generally between the front and rear ends of the baking chamber, the baking chamber also having a rear side at its rear end;
   the insulated enclosure including a pair of lateral walls defining the lateral sides of the baking chamber, a ceiling wall defining the top side of the baking chamber, and a rear wall defining the rear side of the baking chamber;
   the baking chamber having a baking chamber exhaust for exhausting gases from the baking chamber;
   the insulated enclosure substantially completely enclosing at least the baking chamber on its two lateral sides, on its ceiling walls and at its rear wall, with the exception of the baking chamber exhaust;
   the baking chamber also being substantially completely enclosed at its bottom side.

2. Wafer baking oven according to claim 1, wherein the insulated enclosure has a front port portion extending into the region of the front port, the front port portion including an outlet, the insulated enclosure also substantially completely enclosing the front port with the exception of the outlet.

3. Wafer baking oven according to claim 2, wherein the outlet comprises a wafer outlet opening through which baked wafers are discharged from the front port.

4. Wafer baking oven according to claim 3, wherein the outlet also comprises a discharge opening for baking wastes.

5. Wafer baking oven according to claim 3, wherein the outlet also comprises a front port exhaust for gases.

6. Wafer baking oven according to claim 1, wherein the rear wall of the baking chamber is removable from the insulated enclosure.

7. Wafer baking oven according to claim 6, wherein the insulated enclosure at the rear wall of the baking chamber is comprised, at least in part, of at least one rear baking chamber door.

8. Wafer baking oven according to claim 2, wherein the front port portion of the insulated enclosure includes a front port door at one lateral side, the front port door carrying a batter pouring installation, the front port door being pivotable both into a position approximately perpendicular to the running direction of the baking tongs and also into a position parallel to the running direction of the baking tongs.

9. Wafer baking oven according to claim 1, wherein the lateral walls and rear wall of the insulated enclosure are composed of baking chamber doors extending over the entire height of the lateral and rear walls, the baking chamber doors tightly closing against each other and against the ceiling wall, the baking chamber doors bluntly abutting against the ceiling wall.

10. Wafer baking oven according to claim 1, wherein the insulated enclosure comprises a plurality of individual panels, each having edge areas, and a load carrying oven frame; the panels being coupled to the oven frame in a removable manner, the panels abutting against each other, the panels being sealed in their edge areas by panel seals.

11. Wafer baking oven according to claim 10, wherein the panels are sealed against each other.

12. Wafer baking oven according to claim 10 or 11, wherein the panels are sealed against the oven frame.

13. Wafer baking oven according to claim 10 wherein at least some of the panels are in the form of doors.

14. Wafer baking oven according to claim 10, including a transport line coupled with the heating elements of the baking chamber, which transport line carries a gas-air mixture to be supplied to the heating elements, and wherein the oven frame is composed of profiled tubes, a part of the profiled tubes serving as the transport line.

15. Wafer baking oven according to claim 14, including a secondary air line coupled with the heating elements, which secondary air line is for secondary air to be supplied to the heating elements, a part of the profiled tubes of the oven frame also serving as the secondary air line.

16. Wafer baking oven according to claim 10, wherein the panel seals have the configuration of labyrinths.

17. Wafer baking oven according to claim 10, wherein each panel seal is formed by a ledge and a receiving portion, the ledge protruding into the receiving portion.

18. Wafer baking oven according to claim 17, wherein the receiving portion includes a C beam.

19. Wafer baking oven according to claim 17, wherein the receiving portion includes a groove.

20. Wafer baking oven according to claim 17, including a heat resistant gasket material which is arranged inside the receiving portion of the panel, the ledge engaging the gasket material.

21. Wafer baking oven according to claim 17, wherein the ceiling wall and the lateral walls of the insulated enclosure are composed, at least in part, of the panels and wherein, in the panels of the lateral walls, the receiving portions are formed on the panels and the ledge is formed on the oven frame while, in the area of the ceiling wall of the insulated enclosure, the receiving portions are provided on the oven frame and the ledge is provided on the panel.

22. Wafer baking oven according to claim 10, wherein the insulated enclosure has an inside and wherein the panels of the enclosure are bolted from the inside of the insulated enclosure in a closed state, and including a remote control operator for the bolting of at least part of the panels.

23. Wafer baking oven according to claim 5, including an upper track and lower track in the baking chamber for guiding the baking tongs in their movement; and including a front partition between said baking chamber and said front port, said front partition having two sections, each section having a passage opening for the baking tongs, each passage opening cooperating with one or the other of the tracks, the section equipped with the passage opening cooperating with the upper track of the baking tongs being offset to the rear with respect to the section equipped with the passage opening cooperating with the lower track of the baking tongs.

24. Wafer baking oven according to claim 23, wherein the passage openings for the baking tongs each have an outline corresponding essentially to an outline of the cross section of a baking tong taken perpendicular to its running direction.

25. Wafer baking oven according to claim 24, wherein each passage opening for the baking tongs is at least equal in area to the cross sectional area of the baking tong perpendicular to the running direction of the baking tong.

26. Wafer baking oven according to claim 24, wherein the cross sectional area of the passage opening for the baking tongs is larger by 1% to 25% than the cross sectional area of the baking tong perpendicular to the running direction.

27. Wafer baking oven according to claim 24, wherein the cross sectional area of the passage opening for the baking tongs is larger by 5% than the cross sectional area of the baking tong perpendicular to the running direction.

28. Wafer baking oven according to claim 24, including a passage seal provided in the passage openings for the baking tongs.

29. Wafer baking oven according to claim 28, wherein said passage seal for the passage openings for the baking tongs is in the form of glass fiber elements.

30. Wafer baking oven according to claim 28, wherein said passage seal is a labyrinth seal.

31. Wafer baking oven according to claim 28, wherein said passage seal is in the form of glass fiber elements fastened to said front partition between the front port and the baking chamber.

32. Wafer baking oven according to claim 30, wherein the labyrinth passage seal is formed by a plurality of vertical bulkhead plates constituting at least a part of said front partition.

33. Wafer baking oven according to claim 32, wherein two of said bulkhead plates are spaced apart a distance at least equal to the distance between two successive baking tongs.

34. Wafer baking oven according to claim 28, wherein the passage seal is formed by a channel having a passageway corresponding in size and shape in its cross section to the cross section of the baking tongs, both the cross section of the channel and that of the baking tongs being taken perpendicular to the running direction of the baking tongs and the channel having a length in the running direction at least equal to the distance between two successive baking tongs.

35. Wafer baking oven according to claim 23, wherein the front port portion of the insulated enclosure includes air inlet openings through which air may be drawn in operation, which air inlet openings include said wafer outlet opening and said passage openings for said baking tongs.

36. Wafer baking oven according to claim 35, wherein the sum of the areas of the air inlet openings in the front port portion of the insulated enclosure is at least 0.1 to 0.3 times the area of the largest silhouette of the baked wafer, in instances where the baked wafer is a flat wafer or low hollow wafer.

37. Wafer baking oven according to claim 35, wherein the front port may contain a certain maximum number of baking tongs at any one time and wherein the sum of the area of the air inlet openings of the front port portion of the insulated enclosure is at least 0.03 to 1 times the product of the area of the largest silhouette of the wafer and the maximum number of baking tongs in the front port in instances where the baked wafer is a flat wafer or low hollow wafer.

38. Wafer baking oven according to claim 35, wherein the front port may contain a certain maximum number of baking tongs at any one time and wherein the sum of the areas of the air inlet openings in the front port portion of the insulated enclosures is at least 0.3 times the product of the area of the largest silhouette of the wafer and the maximum number of baking tongs in the front port in instances where the baked wafer is a flat wafer or low hollow wafer.

39. Wafer baking oven according to claim 35, wherein the sum of the areas of the air inlet openings in the front port portion of the insulated enclosure corresponds at least to 0.05 times and at most to 0.4 times the product of the area of the largest silhouette of the wafer and the number of baking tongs of the wafer oven where the baked wafer is a flat wafer or low hollow wafer.

40. Wafer baking oven according to claim 1, wherein the outlet opening for the baked wafer in the front port portion of the insulated enclosure is a self-closing opening.

41. Wafer baking oven according to claim 5, wherein the front port exhaust includes an exhaustor having a first and second stage, said exhaustor suctioning off 50–400 times the volume of the front port per hour.

42. Wafer baking oven according to claim 41, wherein the second stage of the exhaustor is actuated by the opening of a part of the front port portion of the insulated enclosure.

43. Wafer baking oven according to claim 5, wherein the front port exhaust includes a two-stage exhaustor, the exhaustor having a first and second stage, wherein the first stage removes at least the steam generated during the charging of the baking tongs with a batter in the front port and wherein the second stage is actuable by the opening of a part of the front port portion of the insulated enclosure and exhausts an additional volume of air which reduces the temperature in the front port, when it is open, to a level acceptable to operating personnel.

44. Wafer baking oven according to claim 43, wherein the first stage of the exhaustor exhausts 50 to 100 times the volume of the housing of the front port and the second stage exhausts 200 to 400 times this volume.

45. Wafer baking oven according to claim 5, wherein the front port exhaust includes a bypass and wherein a heat recovery installation is coupled with the exhaust in said bypass, said heat recovery installation condensing steam generated during charging of the batter tongs with batter by the charging station.

46. Wafer baking oven according to claim 2, said discharge station includes a rotatable multi-arm discharge spider for effecting discharge of baked wafers from the baking tongs, said discharge spider being driven in synchronization with the movement of the baking tongs, the discharge spider being arranged within the front port portion of the insulated enclosure in instances where the baked wafers are flat wafers or low hollow wafers.

47. Wafer baking oven according to claim 46, wherein the discharge spider has lateral sides, and a guide is provided laterally of the discharge spider, said guide revolving synchronously with said spider and limiting the path of the wafers.

48. Wafer baking oven according to claim 47, wherein the discharge spider is carried by a shaft having an axis and wherein two of said guides are mounted on the shaft of the discharge spider and spaced apart a certain mutual axial distance.

49. Wafer baking oven according to claim 48, wherein the mutual axial distance between the guides is adjustable.

50. Wafer baking oven according to claim 48, wherein the mutual axial distance between the guides corresponds to at least 1.00–1.2 times the width of a wafer measured transversely to the running direction of the baking tongs and corresponds to, at most, 1.005–1.3 times a diagonal length of a wafer.

51. Wafer baking oven according to claim 48, wherein each baking tong is openable for discharging a baked wafer and for receiving a fresh charge of batter and closeable for baking of the batter, each baking tong having a closing side at which closing and opening of the baking tong is most pronounced, each baking tong also having a closing roller for effecting closing thereof, one of said guides being arranged on the closing side of the baking tong, and wherein at least the one guide arranged on the closing side of the baking tong has a plurality of radial recesses for the closing roller of the baking tong.

52. Wafer baking oven according to claim 51, wherein each guide is rotatable in a given direction about the axis of the shaft of the spider and each said radial recess has a boundary, the boundary having a boundary portion located forwardly of the remainder of the boundary when considered with respect to the direction of rotation of the guide, said forwardly located boundary portion having a sliding surface, arranged at incline with respect to the axis about which the guide rotates.

53. Wafer baking oven according to claim 48, wherein the guides have the configuration of dinner plates and include convex sides, the convex sides of the guides facing each other.

54. Wafer baking oven according to claim 48, wherein the baking tongs move on a track which has a curved track part at one end, which curved track part has a diameter, the spider having arms with ends which cooperate with said curved track part, the guides being in the shape of disks with a diameter equal to 0.5–1.5 times the diameter of the curved track part with which the ends of the arms of the discharge spider cooperate.

55. Wafer baking oven according to claim 48, wherein said baking tongs move on a track which has a curved track part at one end, which curved track part has a diameter, the spider having arms with ends which cooperate with said curved track part, the guides being in the shape of disks with a diameter equal to 0.9–1.1 times the diameter of the curved track part with which the ends of the arms of the discharge spider cooperate.

56. Wafer baking oven according to claim 48, wherein the outlet opening in the front port portion contributes to effecting exiting of the baked wafers from the front port in a certain path and in a certain direction of transport, and wherein an upper directing device limiting the path of the wafers in the upward direction and guiding them to the outlet opening is provided above the outlet opening for the wafers.

57. Wafer baking oven according to claim 56, wherein the front port portion of the insulated enclosure has a front partition between the front port and the baking chamber and a front wall opposite to said partition, the outlet opening being located in the front wall, and wherein the upper directing device has the configuration of a guiding surface projecting from the front wall of the front port portion and extending into an area above the discharge spider.

58. Wafer baking oven according to claim 56, wherein the upper directing device comprises a baffle plate located at an incline to the path of the wafers exiting from the front port.

59. Wafer baking oven according to claim 56, wherein the upper directing device is composed of a cylindrical surface which is curved, the curve defining a convex side, the convex side facing the path of the wafers.

60. Wafer baking oven according to claim 23, wherein the baking chamber has upper and lower baking chamber sections arranged one above the other, the baking chamber sections having front and rear ends corresponding, respectively, with the front and rear ends of the baking chamber itself, the baking chamber sections being traversed by the baking tongs in operation, the baking chamber sections being separated at least in part by a horizontal intermediate space, the chamber sections communicating at their front ends with the front port through one of the passage openings for the baking tongs, the heating elements being arranged in both of the baking chamber sections, the chamber sections having at least one baking chamber exhaust.

61. Wafer baking oven according to claim 60, wherein said horizontal intermediate space is supplied with air.

62. Wafer baking oven according to claim 60, wherein the two baking chamber sections are connected with each other at one of their ends to provide interconnected ends and are separated at the other ends to provide separated ends, the upper baking chamber section being connected in the area of the separated ends with the baking chamber exhaust.

63. Wafer baking oven according to claim 62, wherein the interconnected ends of the baking chamber sections are the rear ends thereof, the baking chamber exhaust being arranged in the area of the upper baking chamber section and being the only exhaust for the baking chamber effective during operation.

64. Wafer baking oven according to claim 60, wherein the intermediate space separates the two baking chamber sections and extends only over part of the length of the baking chamber and wherein the upper baking chamber section is closed off at its rear end by a rear partition equipped with a rear passage opening for the baking tong and wherein said baking chamber exhaust includes a separate exhaust for each of the two baking chamber sections.

65. Wafer baking oven according to claim 60, wherein the heating elements in both baking chamber sections are arranged over only a part of the length of the baking chamber.

66. Wafer baking oven according to claim 60, wherein the heating elements in each of the baking chamber sections are arranged underneath the track of the baking tongs.

67. Wafer baking oven according to claim 60, wherein the heating elements in each of the baking chamber sections are arranged in each of the baking chamber sections above the track of the baking tongs.

68. Wafer baking oven according to claim 60, wherein the upper and lower baking chambers each have a front area and rear area, the front area being closer to said front end of the baking chamber than the rear area, the rear area being closer to said rear end of said baking chamber than the front area.

69. Wafer baking oven according to claim 68, wherein the heating elements are arranged in the upper baking chamber section in its rear area and in the lower baking chamber section in its front area.

70. Wafer baking oven according to claim 69, wherein the relative dispositions of the heating elements, baking chamber, exhaust, and partition are such that hot gases in both baking chamber sections move in a direction counter to the running direction of the baking tongs from the heating elements to the baking chamber exhaust.

71. Wafer baking oven according to claim 68, wherein the heating elements are arranged in the upper baking chamber section in its front area and in the lower baking room section in its rear area.

72. Wafer baking oven according to claim 60, wherein the heating elements are infrared radiators.

73. Wafer baking oven according to claim 72, wherein the infrared radiators are infrared gas radiators.

74. Wafer baking oven according to claim 72, wherein the infrared radiators are energized with electric current.

75. Wafer baking oven according to claim 72, wherein the heating elements in the form of infrared radiators are arranged both above and under the track of the baking tongs in each of the baking chamber sections.

76. Wafer baking oven according to claim 5, wherein at least one heat recovery installation is connected with the baking chamber exhaust.

77. Wafer baking oven according to claim 76, wherein the heat recovery installation comprises a heat exchanger on the ceiling wall of the baking chamber, said heat exchanger being connected with the baking chamber exhaust.

78. Wafer baking oven according to claim 77, wherein said heat exchanger is also connected with said front port exhaust.

79. Wafer baking oven according to claim 77, wherein said heat exchanger includes at least one heat exchanger element for effecting exchange of heat.

80. Wafer baking oven according to claim 79, including a bypass between said at least one heat exchanger element and said baking chamber, whereby the heat exchanger element may be selectively bypassed.

81. Wafer baking oven according to claim 80, wherein the heat exchanger has a tub-like lower part in which the heat exchanger element is arranged, the tub-like lower part having a closeable gas flow opening, the heat exchanger having a frontal side facing in one longitudinal direction of the baking chamber and a rearward side facing in the other longitudinal direction, the tub-like lower part having a gas outlet opening adjacent the rearward side of the heat exchanger, the heat exchanger also including a gas return channel connected with the gas outlet opening in the tub-like lower part.

82. Wafer baking oven according to claim 81, wherein the tub-like lower part of the heat exchanger is closed off by a removable cover which has top and bottom sides, said gas return channel being arranged in the bottom side of the removable cover, the gas return channel having a lower boundary wall formed by the bottom side of the removable cover, the removable cover closing off the tub-like lower part, the heat exchanger having an interior and an exterior, the gas return channel opening to the exterior of the heat exchanger at the frontal side thereof.

83. Wafer baking oven according to claim 82, wherein the bypass is disposed within the heat exchanger, the bypass including a bypass chamber formed in the tub-like lower part of the heat exchanger, into which bypass chamber the baking chamber exhaust opens, the heat exchanger including an inside wall separating the heat exchanger element from the baking chamber exhaust, the inside wall containing said closeable gas flow opening, and wherein, in said lower boundary wall, which lower boundary wall is disposed above the bypass chamber, a closeable bypass exhaust opening is provided.

84. Wafer baking oven according to claim 83, wherein the front port exhaust also opens into the bypass chamber.

85. Wafer baking oven according to claim 83, wherein the bypass exhaust opening of the bypass chamber opens into the gas return channel and wherein an adjustable butterfly valve is arranged in the bypass exhaust opening of the bypass chamber.

86. Wafer baking oven according to claim 83, wherein said bypass exhaust opening effects communication between said bypass chamber and said gas return channel and wherein a butterfly valve is arranged in the gas return channel to control flow between the bypass chamber and the gas return channel.

87. Wafer baking oven according to claim 81, wherein, in the tub-like lower part of the heat exchanger, a cleaning installation composed of tubes equipped with spray nozzles is provided, whereby the cleansing installation effects cleansing of the heat exchange elements.

88. Wafer baking oven according to claim 81, wherein a negative pressure measuring device is arranged in the heat exchanger, the negative pressure measuring device regulating, by means of a signal emitted by it, the bypass and the cleaning installation of the heat exchanger.

89. Wafer baking oven according to claim 88, wherein said negative pressure measuring device is disposed in said gas return channel.

90. Wafer baking oven according to claim 23, including a display device coupled with said baking chamber and front port for monitoring the operation of the baking tongs, said display device having representations of the baking tongs and their track; and including a sensor for sensing an undischarged wafer remaining in a baking tong, said sensor being coupled with said diplay device.

91. Wafer baking oven according to claim 90, wherein said representations are lamps.

92. Wafer baking oven according to claim 90, wherein said representations are digital displays.

93. Wafer baking oven according to claim 90, wherein each baking tong is carried by a tong carriage and includes a wafer baking mold; each baking tong, tong carriage and wafer baking mold being assigned a symbol; any one particular baking tong, tong carriage carrying the one tong, and mold in the one tong having the same symbol; the number symbols of the waffle mold being pressed or stamped therein as a mirror image; each mold having a batter treating side; the symbol being disposed in the batter treating side.

94. Wafer baking oven according to claim 93, wherein said display device includes means for presenting the symbol of a particular baking tong when a baked wafer adheres to the mold and remains in that particular baking tong after the wafer should have been discharged.

95. Wafer baking oven according to claim 93, wherein said representations are light emitting elements, said presenting means being coupled with said light emitting elements, each light emitting element being correlated with one baking tong, whereby a light emitting element correlated with a particular baking tong is energized when a baked wafer remains in that particular baking tong.

96. Wafer baking oven according to claim 90, including means, cooperating with the baking tongs, for emitting a signal in the case of a wafer remaining in a particular baking tong at the wafer discharge station, which signal is correlated with that particular baking tong, said emitting means including said sensor; and including means for storing the emitted signal and for extinguishing the stored signal upon a return movement of said particular baking tong to the wafer discharge station if the sensor does not, upon such return, emit a new signal correlated with said particular baking tong, said storing and emitting means being coupled with said sensor.

97. Wafer baking oven according to claim 90, wherein the charging station includes a batter pouring installation and including means, coupled with the sensor, for deactivating the batter pouring installation when a wafer remains in a particular baking tong at the wafer discharge station in the front port and when the sensor issues a signal during at least one passage of said particular baking tong past the sensor.

98. Wafer baking oven according to claim 90, wherein the display device has first and second display device parts, the first display device part indicating the baking tong in which a wafer has remained in the tongs at the wafer discharge station, the second display device part indicating a certain baking tong that is located at a particular instant in an area between the wafer discharge station and the charging station.

99. Wafer baking oven according to claim 90, including an adjusting station for baking tongs located along the baking tong tracks and wherein the display device has first and second display device parts, the first display device part indicating the baking tong in which a wafer has remained in the tong at the wafer discharge station, the second display device part indicating a certain baking tong that is located at a particular instant in the adjusting station.

100. Wafer baking oven according to Claims 98 or 99, including a drive coupled with the baking tongs for driving the same and a control coupled with the drive for controlling the drive and including an input device coupled with the second part of the display, by which input device an input signal correlated with the certain baking tong is produced, and wherein said display device includes means for associating said input with the control of the drive for the revolving baking tongs, whereby, following the actuation of the input device, the revolving baking tongs are arrested when the certain baking tong is located as indicated by the second display device part.

101. Wafer baking oven according to claim 2, wherein the baking tongs carry wafer molds therein and wherein the charging station includes a batter pouring installation equipped with a batter reservoir, a pourer and at least one batter pump, the pourer having a plurality of batter exit openings, the batter pump being mounted on the front port portion of the enclosure and having two or more separate batter pouring fluid circuits which are controllable separately of each other, each circuit always comprising only a part of the batter exit openings, which openings are coordinated with the wafer mold contained in a baking tong.

102. Wafer baking oven according to claim 101, wherein the batter reservoir and the batter pump are arranged outside the front port portion of the insulated enclosure.

103. Wafer baking oven according to claim 101, wherein the wafer baking molds are equipped with male and female dies, the female dies having recesses, and wherein a separate batter pouring fluid circuit is provided for each recess of the female die.

104. Wafer baking oven according to claim 101, wherein the wafer baking molds are in the form of baking sheets, which sheets include a plurality of pouring areas, at least two batter pouring fluid circuits being provided for the pouring areas, with each pouring area comprising at least one pouring strip.

105. Wafer baking oven according to claim 104, wherein the pouring areas include a center pouring area having sides and an outer pouring area located on both sides of the center pouring area, and wherein one of the at least two batter pouring fluid circuits pours batter in the center pouring area, while the other batter pouring fluid circuit pours batter in the outer pouring areas.

106. Wafer baking oven according to claim 104, wherein a separate batter pouring fluid circuit is assigned to each pouring strip.

107. Wafer baking oven according to claim 101, wherein each batter pouring fluid circuit includes its own pressure line and a control valve for liquid batter, the control valve regulating the pressure of liquid batter in the pressure line.

108. Wafer baking oven according to claim 107, wherein each batter pouring fluid circuit includes its own batter pump.

109. Wafer baking oven according to claim 108, wherein each batter pouring fluid circuit has only one batter exit opening.

110. Wafer baking oven according to claim 101, wherein the batter exit openings are spaced apart by a certain mutual distance and wherein the mutual distance between the batter exit openings is adjustable in a direction transverse to the running direction of the baking tongs.

111. Wafer baking oven according to claim 108, wherein the batter pouring fluid circuits include parts protruding inside the front port, the pourer being composed of such inside protruding parts, the inside protruding parts being in the form of self-supporting parts certain of which are displaceable with respect to each other and which are surrounded by a thermally insulating sleeve.

112. Wafer baking oven according to claim 111, wherein the pourer includes a common self-supporting housing for the inside protruding parts, the inside protruding parts being arranged inside the common, self-supporting housing.

113. Wafer baking oven according to claim 112, wherein the self-supporting housing is thermally insulating.

114. Wafer baking oven according to claim 112, wherein the self-supporting housing is defined by a housing wall, and wherein the inside protruding parts are in the form of tubes, with thermal insulation being provided between the tubes themselves and between the tubes and the housing wall of the self-supporting housing.

115. Wafer baking oven according to claim 111, wherein the openable baking tongs have hinged parts which may be opened and which form an open space when the baking tongs are open, the inside protruding parts of the batter pouring fluid circuits being movable into said space between the hingedly opened parts of an open baking tong and being removable from said space.

116. Wafer baking oven according to claim 111, wherein the inside protruding parts of the batter pouring fluid circuits are arranged displaceably on the front port.

117. Wafer baking oven according to claim 116, wherein the inside protruding parts of the batter pouring fluid circuits are pivotably mounted with respect to the front port.

118. Wafer baking oven according to claim 117, wherein the front port portion of the insulated enclosure includes a front port door pivotably mounted thereon and wherein the inside protruding parts of the batter pouring fluid circuits are mounted on the front port door, the control valves of the batter pouring circuits being arranged outside the insulated enclosure.

119. Wafer baking oven according to claim 118, wherein the front port door is thermally insulated.

120. Wafer baking oven according to claim 116, wherein the front port portion includes a front port door having one side facing the inside of the insulated enclosure, which one side is the inside of the front port door, the batter pouring installation being fastened to the front port door of the front port, and wherein the inside protruding parts of the batter pouring fluid circuits project from said inside of the front port door, the other side of the front port door being the outside thereof which faces outside the insulated enclosure, the control valve of the batter pouring fluid circuits being mounted on said outside of the front port door.

121. Wafer baking oven according to claim 120, wherein the insulated enclosure includes an oven frame and wherein the front port door carrying the batter pouring installation is supported by means of two door arms pivotably mounted on said inside of the door, the door arms being coupled with two swivelling arms rotatingly mounted on the oven frame.

122. Wafer baking oven according to claim 121, wherein said two arms are in the form a C-shaped strap.

123. Wafer baking oven according to claim 121, wherein the front port door has lateral edges and a center axis, both of the swivelling arms being mounted on the oven frane in the region of one of the lateral edges of the front port door, the swivelling arms being mounted for rotation around a vertical axis, the door arms being pivotably supported in the region of the center axis of the door for movement around a vertical axis on the inside of the door, the door arms in turn being rotatingly supported around a vertical axis on the swivelling arms.

124. Wafer baking oven according to claim 121, wherein said pourer is mounted on the inside of said front port door and wherein a guide ledge is mounted on the inside of the front port door above the pourer, the guide ledge protruding from the door and wherein guide rails are provided in the front port and fastened to the oven frame, the guide ledge cooperating with the guide rails.

125. Wafer baking oven according to claim 107, wherein, for the regulation of the volume of batter, each batter pouring fluid circuit has its own control valve.

126. Wafer baking oven according to claim 108, including adjustable drive gears for driving the batter pumps, and wherein, for the regulation of the volume of batter, each batter pump of the batter pouring installation is driven by means of its own adjustable drive gear.

127. Wafer baking oven according to claim 126, wherein at least two pumps, both with their own drive gear, are provided for the batter pouring fluid circuits.

128. Wafer baking oven according to claim 127, wherein the pumps of the batter pouring fluid circuits are each equipped with a single drive gear in the form of a chain sprocket with a certain number of teeth, the pumps having drive stubs on which the sprockets are arranged, whereby the number of teeth of the sprocket arranged on the drive stub of each pump may be varied for the regulation of the volume of batter.

129. Wafer baking oven according to claim 128, wherein the batter pouring installation includes a chain drive for driving the chain sprockets.

130. Wafer baking oven according to claim 127, wherein the pumps of the batter pouring installation are driven by control gears, which in turn are driven by a single batter installation motor.

131. Wafer baking oven according to claim 1, including:
a main drive motor, the main drive motor being coupled with baking tongs, the main drive motor having an axle stub,
an auxiliary drive arranged on said axle stub,
a claw clutch is mounted on the axle stub of the main drive motor, and
an air motor, a free-wheel and a worm gear, said air motor being connected with said claw clutch via the free-wheel and worm gear.

132. Wafer baking oven according to claim 56, wherein the upper directing device comprises a plurality of adjacently arranged rods, said rods being located above the path of the wafers in the region of the outlet opening for the wafers.

133. Wafer baking oven according to claim 132, wherein the rods forming the upper directing device extend at a downward incline in the direction of the path of the wafers.

134. Wafer baking oven according to claim 132, wherein the rods forming the upper directing device are curved such that each has a convex side, the rods facing the path of the wafers with their convex sides.

135. Wafer baking oven according to claim 81, wherein the heat exchanger has ends and wherein the heat exchanger is connected at one end with the front port exhaust and is connected at the other end with the baking chamber exhaust, the heat exchanger having a common exhaust channel for both the front port exhaust and the baking chamber exhaust.

136. Wafer baking oven according to claim 135, including an inlet opening for connecting the front port exhaust to the heat exchanger and an inlet opening for connecting the baking chamber exhaust to the heat exchanger.

137. Wafer baking oven according to claim 136, wherein the tub-like lower part of the heat exchanger contains two separate heat exchanger elements, one of said heat exchanger elements being arranged adjacently to the inlet opening for the front port exhaust, the other being located adjacent to the inlet opening for the baking chamber exhaust, the heat exchanger also including a common exhaust orifice for both heat exchanger elements, said common exhaust orifice being located between the two heat exchange elements.

138. Wafer baking oven according to claim 137, wherein the gas return channel is disposed above the heat exchanger elements, and wherein the common exhaust orifice of the heat exchange elements opens into the gas return channel.

139. Wafer baking oven according to claim 138, wherein the bypass includes a bypass exhaust opening and wherein the heat exchanger includes an area over the front port exhaust in which area the bypass exhaust opening is disposed.

140. Wafer baking oven according to claim 138, wherein the bypass includes a bypass exhaust opening and wherein the heat exchanger includes an area over the baking chamber exhaust in which area the bypass exhaust opening is disposed.

141. Wafer baking oven according to claim 139 or 140, wherein said bypass opening is closeable by a flap.

142. Wafer baking oven according to claim 136, wherein the bypass includes a bypass chamber in the heat exchanger, a bypass exhaust opening in the bypass chamber, and a gas flow opening, and wherein a separate heat exchanger element is disposed between: one of said inlet openings for an exhaust, the gas flow opening, and the bypass opening itself, whereby the separate heat exchange element may be used for the heating of compressed air.

143. Wafer baking oven according to claim 3, wherein lateral directing devices laterally limiting the path of the wafers and extending through the wafer outlet opening are provided in the front port portion of the insulated enclosure, said lateral directing devices being pivotable around axes perpendicular to the path of the wafers.

144. Wafer baking oven according to claim 143, wherein the path of the wafers has a longitudinal center axis and wherein the pivoting, lateral directing devices have a section extending at an incline with respect to the longitudinal center axis of the path of the wafer.

145. Wafer baking oven according to claim 143, wherein the pivoting lateral directing devices have pivoting axles on their front ends as viewed in the direction of transport of the wafers, with a section parallel to the wafer path extending from said pivoting axles, followed by a section which is laterally inclined with respect to the wafer path.

146. Wafer baking oven according to claim 143, wherein the pivoting lateral directing devices have pivoting axles about which they pivot and have ends opposite to the pivoting axles, said ends of the lateral directing devices engaging the rotating guides, the rotating guides being equipped with projections distributed over their circumference, said projections moving the pivoting lateral directing devices back and forth during the rotation of the rotating guides.

147. Wafer baking oven according to claim 143, wherein at least one of the pivoting lateral directing devices abuts against a rotating eccentric having a rotational axis perpendicular to the path of the wafers.

148. Wafer baking oven according to claim 146 or 147, wherein the pivoting lateral directing devices are biased in one pivoting direction by at least one tension spring located between two pivoting lateral directing devices.

149. Wafer baking oven according to claim 60, wherein the intermediate space between the upper and the lower baking chamber sections is equipped with a ventilation orifice.

150. Wafer baking oven according to claim 60, wherein said intermediate space is thermally insulated with respect to the baking chamber sections.

151. Wafer baking oven according to claim 60, wherein said intermediate space located between the upper and lower baking chamber sections is cooled.

152. Wafer baking oven according to claim 56, wherein baked wafers are discharged from the front port in a certain direction of transport and wherein the upper directing device comprises a pipe, equipped with one or more compressed air outlets, directed in the downward direction and arranged transversely to the direction of transport of the wafers.

* * * * *